US005742530A

United States Patent [19]
Gressel et al.

[11] Patent Number: 5,742,530
[45] Date of Patent: Apr. 21, 1998

[54] COMPACT MICROELECTRONIC DEVICE FOR PERFORMING MODULAR MULTIPLICATION AND EXPONENTIATION OVER LARGE NUMBERS

[75] Inventors: Carmi David Gressel, Kibbutz Urim; David Hendel, Raanana; Itai Dror; Isaac Hadad, both of Beer-Sheva; Benjamin Arazi, Omer, all of Israel

[73] Assignee: Fortress U&T Ltd., Beer-Sheva, Israel

[21] Appl. No.: 579,951

[22] Filed: Dec. 28, 1995

Related U.S. Application Data

[63] Continuation of Ser. No. 154,220, Nov. 18, 1995, Pat. No. 5,513,133.

[30] Foreign Application Priority Data

| Nov. 30, 1992 | [IL] | Israel | 103921 |
| Feb. 16, 1993 | [IL] | Israel | 104753 |
| Sep. 6, 1993 | [IL] | Israel | 106923 |

[51] Int. Cl.$^6$ ............................................. G06F 7/38
[52] U.S. Cl. ............................................................. 364/746
[58] Field of Search ........................... 364/746, 746.1, 364/753, 754, 759

[56] References Cited

U.S. PATENT DOCUMENTS

| 4,625,076 | 11/1986 | Okamoto et al. | 178/22.1 |
| 4,891,781 | 1/1990 | Omura | 364/768 |
| 5,073,870 | 12/1991 | Morita | 364/746 |
| 5,101,431 | 3/1992 | Even | 380/30 |
| 5,121,431 | 6/1992 | Wiener | 380/49 |
| 5,159,632 | 10/1992 | Crandall | 380/28 |
| 5,210,710 | 5/1993 | Omura | 364/746.1 |
| 5,261,001 | 11/1993 | Dariel et al. | 380/30 |
| 5,321,752 | 6/1994 | Iwamura et al. | 380/24 |

FOREIGN PATENT DOCUMENTS

| 0 281 303 | 9/1988 | European Pat. Off. |
| 0 350 278 | 1/1990 | European Pat. Off. |
| 0 502 782 A2 | 3/1992 | European Pat. Off. |
| 0 531 158 A2 | 4/1992 | European Pat. Off. |

OTHER PUBLICATIONS

Federal Information Processing Standards Publication, "Specifications for a Digital Signature Standard (DSS)", Draft 19 Aug. 1991, pp. 1–11 (Applicants cited art.).

Tomlinson, "Modulo multiplier to enhance encryption rates", Electronic Engineering, vol. 62, No. 760, London, GB, 1990, p. 25.

John D. Lenk, *Handbook of Microprocessors, Microcomputers, and Minicomputers*; Chapter 4, pp. 203–266; (Prentice–Hall, 1979; ISBN 0–13–380378–3).

Federal Register, Aug. 30, 1991, Federal Information Processing Standards Publication issued by the National Institute of Standards and Technology, "Announcing A Digital Signature Standard", Draft 19 Aug. 1991, front page and pp. 1–4.

(List continued on next page.)

*Primary Examiner*—Chuong Dinh Ngo
*Attorney, Agent, or Firm*—Merchant, Gould, Smith, Edell, Welter & Schmidt, P.A.

[57] ABSTRACT

A compact synchronous microelectronic peripheral machine for standard microprocessors with means for proper clocking and control, has as essential elements: three main subdivided, switched and clocked shift registers, B, S, and N; two only multiplexed serial/parallel multipliers; borrow detectors, ancillary subtractors and adders; delay registers and switching elements; all of which embody a totally integrated concurrent and synchronous process approach to modular multiplication, squaring, and exponentiation. A method for carrying out modular multiplication, wherein the multiplicand A, the multiplier B and the modul, N, comprise m characters of k bits each, the multiplier not being greater than the modulus, is also described, wherein the multiplicand can be much larger than the modulus. It is demonstrated how the device can be used as a large number processor in the normal field of numbers.

16 Claims, 8 Drawing Sheets

OTHER PUBLICATIONS

P.L. Montgomery, Modular Multiplication Without Trial Division Mathematics of Computation, vol. 44, pp. 519–521, 1985.

S.R. Dusse and B.S. Kaliski Jr., "Cryptographic Library for the Motorola DSP 56000", Proc. Eurocrypt '90, Spring-Verlag, Berlin, 1990. pp. 230–244.

D. Knuth, "The Art of Computer Programing", vol. 2; Seminumerical Algorithms, Addison–Wesley, Reading Mass., 1981.

R.L. Rivest et al, "A method for Obtaining Digital Signatures and Public Key Cryptosystems", Comm. of ACM, vol. 21, 120–126, 1978.

W. Diffie and M.E. Hellman, "New Directions in Cryptography", IEEE Trans. on Inform. Theory, vol. IT–22, 644–654, 1976.

Proceeding of Advances in Cryptology–Crypto '89, 20–24 Aug. 1989, Santa Barbara, CA., USA. In: Lecture Notes in Computer Science, vol. 435, G. Brassard (Editor), 1990, Springer–Verlag, New York pp. 371–386, XP000135672. P. Findlay 'Modular Exponentiation Using Recursive Sums of Residues'.

COMPACT MICROELECTRONIC DEVICE FOR PERFORMING MODULAR MULTIPLICATION AND EXPONENTIATION OVER LARGE NUMBERS

This is a Continuation of application Ser. No. 08/154,220, filed 18 Nov 1995, now U.S. Pat. No. 5,513,132 which application are incorporated herein by reference.

FIELD OF THE INVENTION

The present invention relates to modular processing of large numbers in the Galois field of prime numbers and also of composite prime modules. More specifically, the invention relates to a device to implement modular multiplications/exponentiations of large numbers, which is suitable for performing the operations essential to Public Key Cryptographic authentication and encryption protocols, which cannot be executed with small microprocessors in reasonable processing time.

BACKGROUND OF THE INVENTION

The present invention relates to the hardware implementation of a procedure known as "the interleaved Montgomery multiprecision modular multiplication method" often used in encryption software oriented systems. A unique original method is provided to accelerate modular exponentiation; and vital proofs are used to simplify the architecture and extend the use of the device to large number calculations in the normal field of numbers.

The basic process is one of the three published related methods for performing modular multiplication with Montgomery's methodology. [P. L. Montgomery, "Modular multiplication without trial division", *Mathematics of Computation*, vol. 44, pp. 519–521, 1985], hereinafter referred to as "Montgomery", [S. R. Dusse and B. S. Kaliski Jr., "A cryptographic library for the Motorola DSP 56000", *Proc Eurocrypt '90*, Springer-Verlag, Berlin, 1990] hereinafter referred to as "Dusse".

In this hardware implementation, security mechanisms and "on the fly" additions, subtractions, and moves have been added; processes whose total output might be irrelevant have been removed; a relatively easy to implement on silicon type of design has been invented and has been integrated to be appended to the internal data/address bus as a slave to virtually any 8, 16 or 32 bit Central Processing Unit (CPU).

Because of the simple synchronized shift design, the multiplying/squaring machine can run at clock speeds several times faster than speeds presently attainable with CPU's which support on board non-volatile memory devices. This method demands no design changes in the memory architecture of the CPU as prescribed by implementations using parallel multipliers and dual ported memories for fast modular multiplication of large numbers as in the Philips circuit. [Philips Components, "83C852, *secured 8-bit microcontroller for contiditional access applications*", Einhoven, August, 1990], hereinafter referred to as "Philips".

The essential architecture is of a machine that can be integrated to any microcontroller design, mapped into memory; while working in parallel with the controller which must constantly load commands and operands, then unload and transmit the final answer.

The unique solution uses only two serial/parallel multipliers, and a complete serial pipelined approach that saves silicon area. Using present popular technologies, it enables the integration of the complete solution including a microcontroller with memories onto a 4 by 4.5 by 0.2 mm microelectronic circuit that can meet the ISO 7816 standards. [International Organization for Standardization, "Identification cards—integrated circuit cards", ISO 7816:

Part 1—ISO 7816-1, "Physical characteristics", 1987,

Part 2—ISO 7816-2, "Dimensions of locations of contacts", 1988.

Part 3—ISO/IEC 7816-3, "Electronic signals & transmission protocols", 1989.]

hereinafter referred to as "ISO 7816".

The invention is directed to the architecture of this solution, based on mathematical innovations, published by Montgomery, with several modifications and improvements and non-obvious methods are provided for reducing the time necessary for modular exponentiation to little more than half the time required using known processing and the Montgomery method.

DEFINITIONS, GENERAL PRINCIPLES AND METHODS

The invention will be illustrated in the description to follow, making use of the general principles and methods described below.

For modular multiplication in the prime and composite prime field of numbers, we define A and B to be the multiplicand and the multiplier, and N to be the module which is usually larger than A or B. N may in some instances be smaller than A. We define A, B, and N as m·k=n bit long operands. Each k bit group will be called a character. Then A, B, and N are each m characters long. For ease in following the first implementation and in the step by step procedural explanation, assume that A, B, and N are 512 bits long, (n=512); assume that k is 32 bits long because of the present cost effective length of the multipliers; and m=16 is the number of characters in an operand and also the number of iterations in a squaring or multiplying loop with a 512 bit operand. Obviously, all operands are integers. We use the symbol, ≡, to denote congruence of modular numbers, for example 16≡2 mod 7, and we say 16 is congruent to 2 modulo 7 as 2 is the remainder when 16 is divided by 7. When we write Y mod N≡X mod N; both Y and X may be larger than N; however, for positive X and Y, the remainders will be identical. Note also that the congruence of a negative integer Y, is Y+u N, where N is the modulus, and if the congruence of Y is to be less than N, u will be the smallest integer which will give a positive result.

We use the symbol, ¥, to denote congruence in a more limited sense. During the processes described herein, a value is often either the desired value, or equal to the desired value plus the module. For example X¥2 mod 7. X can be equal to 2 or 9. We say X has limited congruence to 2 mod 7.

When we write X=A mod N, we define X as the remainder of A divided by N; e.g., 3=45 mod 7.

In number theory the modular multiplicative inverse is a basic concept. For example, the modular multiplicative inverse of X is written as $X^{-1}$, which is defined by $XX^{-1}$ mod N=1. If X=3, and N=13, then $X^{-1}$ =9, i.e., the remainder of 3·9 divided by 13 is 1.

The acronyms MS and LS are used to signify most significant and least significant when referencing bits, characters, and full operand values.

Throughout this specification N designates both the value N, and the name of the shift register which contains N. A and N are constant values throughout an entire exponentiation. A is the value of the number which is to be exponentiated. During the first iteration of an exponentiation, B is equal to A. B is also the name of the register wherein the accumulated value which finally equals the desired result of exponentiation resides. S designates a temporary value, and also the register in which the ¥ of S is stored. S(i−1) denotes the value of S at the outset of the i'th iteration; $S_0$ denotes the LS character of an S(i)'th value.

We refer to the process, (defined later) $\wp(A \cdot B)N$ as multiplication in the $\wp$ field, or sometimes, simply, a multiplication operation.

Other symbols are those conventionally used in the arithmetics.

Montgomery Modular Multiplication

In a classic approach for calculating a modular multiplication, A·B mod N, the remainder of the product A·B is calculated by a division process. Implementing a division operation is more difficult to perform than a multiplication operation.

By using Montgomery's modular reduction method, the division is essentially replaced by multiplications using precalculated constants.

The Montgomery function $\wp(A \cdot B)N$ performs a multiplication modulo N of the A·B product into the $\wp$ field. The retrieval from the $\wp$ field back into the normal modular field is performed by enacting $\wp$ on the result of $\wp(A \cdot B)N$ and a precalculated constant H. Now, if $P \equiv \wp(A \cdot B)N$, then $\wp(P \cdot H) N \equiv A \cdot B$ mod N; thereby performing a normal modular multiplication in two $\wp$ field multiplications.

The intention of efficient modular reduction methods is to avert a series of multiplication and division operations on operands that are n and 2n bits long, by performing a series of multiplications, additions, and subtractions on operands that are n bits long, and that yield a final result that is a maximum of n bits long. In order to illustrate the Montgomery precept, we observe that for given A, B and odd N (these odd modules are always either simple or a composite of large primes), there is always a Q, such that A·B+Q·N will result in a number whose n LS bits are zero, or:

$$P \cdot 2^n = A \cdot B + Q \cdot N$$

This means that we have an expression 2n bits long, whose n LS bits are zero.

Now, let $I \cdot 2^n \equiv 1$ mod N (I exists for all odd N). Multiplying both sides of the previous equation by I yields the following congruences:
from the left side of the equation:

$$P \cdot I \cdot 2^n \equiv N; \text{ (Remember that } I \cdot 2^n \equiv 1 \text{ mod } N)$$

and from the right side:

$$A \cdot B \cdot I + Q \cdot N \cdot I \equiv AB \cdot I \text{ mod } N; \text{ (Remember that } Q \cdot N \cdot I \equiv 0 \text{ mod } N)$$

therefore:

$$P \equiv A \cdot B \cdot I \text{ mod } N.$$

Unfortunately, this also means that a parasitic factor I is introduced each time a $\wp$ field multiplication is performed.

We define the $\wp$ operator such that:

$$P \equiv A \cdot B \cdot I \text{ mod } N \equiv \wp(A \cdot B)N.$$

and we call this "multiplication of A times B in the $\wp$ field".

The retrieval from the $\wp$ field is calculated by operatin $\wp$ on P·H, making:

$$\wp(P \cdot H)N \equiv A \cdot \text{mod } N;$$

We can derive the value of H by substituting P in the previous congruence. We find:

$$\wp(P \cdot H)N \equiv (A \cdot B \cdot I)(H)(I) \text{ mod } N;$$

(see that A·B·I←P; H←H; I←and any multiplication operation introduces a parasitic I)

If H is congruent to the multiple inverse of $I^2$ then the congruence is valid, therefore:

$$H = I^{-2} \text{ mod } N \equiv 2^{2n} \text{ mod } N$$

(H is a function of N and we call it the H parameter)

To enact the $\wp$ operator on A·B we pursue the following process, using the precalculated constant J:

1) X=A·B
2) Y=(X·J) mod $2^n$ (only the n LS bits are necessary)
3) Z=X 30 Y·N
4) S=Z/$2^n$ (The requirement on J is that it forces Z to be divisible by $2^n$)
5) P¥S mod N (N is to be subtracted from S, if S≧N)

Finally, at step 5):

$$P \text{¥} \wp(a \cdot B)N.$$

[After the subtraction of N, if necessary:

$$P = \wp(A \cdot B)N.]$$

Following the above:

$$Y = A \cdot B \cdot J \text{ mod } 2^n \text{ (using only the n LS bits);}$$

and:

$$Z = A \cdot B + (A \cdot B \cdot J \text{ mod } 2^n) \cdot N.$$

In order that Z be divisible by $2^n$ (the n LS bits of Z must be zero) the following congruence must exist:

$$[A \cdot B + (A \cdot B \cdot J \text{ mod } 2^n) \cdot N] \text{ mod } 2^n \equiv 0$$

In order that this congruence will exist, N·J mod $2^n$ must be congruent to −1 or:

$$J \equiv -N^{-1} \text{ mod } 2^n.$$

and we have found the constant J.

J, therefore, is a precalculated constant which is a function of N only, and, obviously, we must always choose that positive J which is smaller than N.

Therefore, as will be apparent to the skilled person, the process shown employs three multiplications, one summation, and a maximum of one subtraction, for the given A, B, N, and a precalculated constant; we obtain $\wp(A \cdot B)N$. Using this result, the same process and a precalculated constant, H, (a function of the module N) we are able to find A·B mod N. As A can be equal to B, this operator can be used as a device to square or multiply in the modular arithmetic.

Interleaved Montgomery Modular Multiplication

In the previous section there was shown a method for modular multiplication which demanded multiplications of operands which were all n bits long, and results which required 2n+1 bits of storage space.

Using Montgomery's interleaved reduction (as described in the aforementioned paper by Dusse), it is possible to perform the multiplication operations with shorter operands, registers, and hardware multipliers; enabling the implementation of an electronic device with relatively few logic gates.

Using a k bit multiplier, it is convenient to define characters of k bit length; there are m characters in n; i.e., m·k=n. $J_0$ will be the LS character of J.
Therefore:

$$J_0 \equiv -N_0^{-1} \bmod 2^k \ (J_0 \text{ exists as } N \text{ is odd}).$$

Then, using Montgomery's interleaved reduction, $\wp(A \cdot B)N$ is enacted in m iterations with the following initial condition, pursuing steps (1) to (5). The circuit of the invention follows these steps in a concurrent fashion.

Initially $S(0)=0$ (the ¥ value of S at the outset of the first iteration).

For i=1, 2 .... m:

(1) $X=S(i-1)+A_{i-1} \cdot B$ ($A_{i-1}$ is the i-1 th character of A; $S(i-1)$ is the value of S at the outset of the i'th iteration.)

(2) $Y_0=X_0 \cdot J_0 \bmod 2^k$ (The LS k bits of the product of $X_0 \cdot J_0$) (The process uses and calculates the k LS bits only, e.g., the least significant 32 bits)

(3) $Z=X+Y_0 \cdot N$ (4) $S(i)=Z/2^k$ (The k LS bits of Z are always 0, therefore Z is always divisible by $2^k$. This division is tantamount to a k bit right shift as the LS k bits of Z are all zeros; or as will be seen in the circuit, the LS k bits of Z are simply disregarded.

(5) $S(i)=S(i) \bmod N$ (N is to be subtracted from those $S(i)$'s which are larger than N).

Finally, at the last iteration (after the subtraction of N, when necessary), $C=S(m)=\wp(A \cdot B)N$. To derive $F=A \cdot B \bmod N$, we must perform the $\wp$field calculation, $\wp(C \cdot H)N$.

Now, we prove that for all $S(i)$'s, $S(i)$ is smaller than 2N (not included in Montgomery's proof.)

We observe that for operands which are used in the process:

$$S(i-1) < N; \ B < N \text{ and } A_{i-1} < 2^k.$$

(The first two inequalities hold, as at the outset of an iteration N is subtracted from $S(i-1)$ and B, when they were either larger than or equal to N. The third inequality holds as $2^k$ is a k+1 bit long number whose MS bit is "1", while $A_{i-1}$ is a k bit long operand.)

By definition:

$$S(i)=Z/2^k \text{ (The value of S at the end of the process, before a possible subtraction)}$$

Substituting in the above set of equations:

$$Z=S(i-1)+A_{i-1} \cdot B+(X_0 \cdot J_0 \bmod 2^k)N$$

Note that taking the maximum value of each element in the previous equation we have the inequality on Z:

$$Z<(N-1)+(2^k-1)\cdot(N-1)+(2^k-1)\cdot N=2^k N+2^k N-N-2^k$$

and then certainly:

$$Z<2^k \cdot N+2^k \cdot N.$$

Now, dividing both sides of the inequality by $2^k$:

$$Z/2^k<N+N,$$

and we have proved that one subtraction of N is all that may ever be necessary to rectify an $S(i)$ or a B.

EXAMPLE 1

An Interleaved Modular Multiplicaton

The following calculations can easily be verified with a hand calculator which has a hexadecimal mode. Using the hexadecimal format, assume: N=a59, (the modulus), A=99b, (the multiplier), B=5c3 (the multiplicand), n=12, (the bit length of N), k=4, (the size in bits of the multiplier and also the size of a character), and m=3, as n=k·m.

$J_0=7$ as $7 \cdot 9 \equiv -1 \bmod 16$ and $H \equiv 2^{2 \cdot 12} \bmod a59 = 44b$.

The expected result is $F \equiv A \cdot B \bmod N \equiv 99b \cdot 5c3 \bmod a59 \equiv 375811 \bmod a59 = 220_{16}$.

Initially: $S(0)=0$

| | |
|---|---|
| Step 1 | $X = S(0) + A_0 \cdot B = 0 + b \cdot 5c3 = 3f61$ |
| | $Y_0 = X_0 \cdot J_0 \bmod 2^k = 7$ |
| | $Z = X + Y_0 \cdot N = 3f61 + 7 \cdot a59 = 87d0$ |
| | $S(1) = Z/2^k = 87d$ (which is smaller than N) |
| Step 2 | $X = S(1) + A_1 \cdot B = 87d + 9 \cdot 5c3 = 3c58$ |
| | $Y_0 = X_0 \cdot J_0 \bmod 2^k = 8 \cdot 7 \bmod 2^4 = 8$ |
| | $Z = X + Y_0 \cdot N = 3c58 + 52c8 = 8f20$ |
| | $S(2) = Z/2^k = 8f2$ (which is smaller than N) |
| Step 3 | $X = S(2) + A_2 \cdot B = 8f2 + 9 \cdot 5c3 = 3ccd$ |
| | $Y_0 = d \cdot 7 \bmod 2^4 = b$ |
| | $Z = X + Y_0 \cdot N = 3ccd + b \cdot a59 = aea0$ |
| | $S(3) = Z/2^k = aea$, as $S(3) > N$, |
| $S(3) = aea - a59 = 91$ | |
| Therefore $C = \wp(A \cdot B)N = 91_{16}$. | |

Retrieval from the $\wp$field is performed by calculating $\wp(C \cdot H)N$: Again initially: $S(0)=0$

| | |
|---|---|
| Step 1 | $X = S(0) + C_0 \cdot H = 0 + 1 \cdot 44b = 44b$ |
| | $Y_0 = d$ |
| | $Z = X + Y_0 \cdot N = 44b + 8685 = 8ad0$ |
| | $S(1) = Z/2^k = 8ad$ |
| Step 2 | $X = S(1) + C_1 \cdot H = 8ad + 9 \cdot 44b = 2f50$ |
| | $Y_0 = 0$ |
| | $Z = X + Y_0 \cdot N = 2f50 + 0 = 2f50$ |
| | $S(2) = Z/2^k = 2f5$ |
| Step 3 | $X = S(2) + C_2 \cdot H = 2f5 + 0 \cdot 44b = 2f5$ |
| | $Y_0 = 3$ |
| | $Z = X + Y_0 \cdot N = 2f5 + 3 \cdot a59 = 2200$ |
| | $S(3) = Z/2^k = 220_{16}$ | which is the expected value of $99b \ 5c3 \bmod a59$.

The validity of the operation can be understood intuitively, when we realize that if at each step we disregard k LS zeros, we are in essence multiplying the n MS bits by $2^k$. Likewise, at each step, the i'th segment of the multiplier is also a number multiplied by $2^{ik}$, giving it the same rank as $S(i)$.

Modular Reduction on a Montgomery Machine in one Multiplication Process

Many cryptographic processes such as the NIST Digital Signatures Standard or modular exponentiation using the Chinese Remainder Theorem require reducing a number which is larger (often more than twice as large) than a second modulus. These modular reductions can efficiently be executed in one interleaved Montgomery multiplication using the machine of the invention and a non-obvious extension to the Montgomery algorithm.

Note that in the previous examples, it was implied that n, the length of the modulus, of the operand was also the exact length of N. For ordinary exponentiations and multiplications this would be most efficient. However, in those cases where a reduction in size is necessary, use can be made of a second constant, $\Gamma^{-1}=2^n \bmod N$, which when Montgomery multiplied by the number to reduced, in one operation effects a minimum reduction. This constant, $I^{-1}$, can be calculated with the same mechanism which calculates the constant H (see sections on calculating H parameter), by placing the module, N, in the most significant part of the divisor operand, so that its most significant "1" rests in the most significant bit of the divisor register. The number of shift/ trial-subtracts, obviously, must now be n+1–L, wherein L is the number of relevant bits of N. Note that this $I^{-1}$ will be an operand L bits long.

To prove this premise, first we repeat that a Montgomery multiplication of A B mod N, ($\wp(A \cdot B)N$), yields the congruence $A \cdot B \cdot I$ mod N. If we assign $B = I^{-1}$, then:

$\wp(A \cdot I^{-1})N = A \cdot I^{-1} \cdot I$ mod $N \equiv A$ mod $N$.

EXAMPLE 2

An Interleaved Montgomery Reduction

To demonstrate a reduction of t to mod q (t mod q), wherein the length of the multiplying register where t initially stored is 24 bits long, is larger than the length of q.

Assume a word length (size of machine multiplier) of 8 bits, and the following test variables:

n=24; k=8; t=0a f5 9b; q=2b 13; and $R = I^{-1} = 2^{24}$ mod q=141d.

Using a simple division calculation we know for comparison that t mod q=5c8.

Note that the reduction and retrieval are performed in one Montgomery multiplication.

Initially: S(0)=0, A=t=0a f5 9b, B=R=141d, N=q=2b 13

| Step 1 | $X = S(0) + A_0 \cdot B = 0 + 9b \cdot 141d = c\ 2d\ 8f$ |
| --- | --- |
| | $Y_0 = X_0 \cdot J_0$ mod $2^k = 8f \cdot e5$ mod $2^8 = eb$ |
| | $Z = X + Y_0 \cdot N = c\ 2d\ 8f + eb \cdot 2b\ 13 = 33\ b8\ 00$ |
| | $S(1) \yen Z/2^k$ mod $N = 33\ b8$ which is larger than N |
| | $S(1) = 33\ b8 - 2b\ 13 = 8\ a5$ |
| Step 2 | $X = S(1) + A_1 \cdot B = 8\ a5 + f5 \cdot 141d = 13\ 48\ 66$ |
| | $Y_0 = X_0 \cdot J_0$ mod $2^k = 66 \cdot E5$ mod $2^8 = 3e$ |
| | $Z = X + Y_0 \cdot N = 13\ 48\ 66 + 3e \cdot 2b\ 13 = 1d\ b7\ 00$ |
| | $S(2) = Z/2^k$ mod $N = 1d\ b7$ |
| Step 3 | $X = S(2) + A_2 \cdot B = 1d\ b7 + 0A \cdot 14\ 1d = e6\ d0$ |
| | $Y_0 = d9 \cdot e5$ mod $2^8 = 1d$ |
| | $Z = X + Y_0 \cdot N = e6\ d9 + 1d \cdot 2b\ 13 = 5\ c8\ 00$ |
| | $S(3) = Z/2^k$ mod $N = 5\ c8$ |

And t mod q=5c8, as was previously calculated.

Exponentiation

The following derivation of a sequence [D. Knuth, *The art of computer programming*, vol. 2: Seminumerical algorithms, Addison-Wesley, Reading Mass., 1981] hereinafter referred to as "Knuth", explains a sequence of squares and multiplies, which implements a modular exponentiation.

Assuming that we have precalculated the constants in the above section, and that our device can both square and multiply in the $\wp$field; we wish to calculate:

$C = A^E$ mod N.

Let E(j) denote the j th bit in the binary representation of the exponent E, starting with the MS bit whose index is 1 and concluding with the LS bit whose index is q, we can exponentiate as follows:

a) B=A
FOR j=2 TO q
  a) $B \yen \wp(B \cdot B)N$
  b) $B \yen \wp(B \cdot H)N$ (steps a and b are equivalent to $B \yen B^2$ mod N)

IF E(j)=1 THEN
  $B \yen \wp(B \cdot A)N$
  b) $B \yen \wp(B \cdot H)N$ (steps a and b are equivalent to $B \yen B \cdot A$ mod N) In the transition from each step to the next, N is subtracted from B whenever B is larger than or equal to N.

After the last iteration, the value B is ¥ to $A^E$ mod N.

There are more efficient proprietary protocols that could be used with the described circuitry to perform modular exponentiation; we name two encryption protocols on which the method described herein will often double the speed of exponentiation. In the RSA method [R. L. Rivest et. al., "A method for obtaining digital signatures and public key cryptosystems", *Comm. of the ACM*, vol. 21, 120–126, 1978] hereinafter referred to as "RSA" and the Diffie-Hellman protocol [W. Diffie and M. E. Hellman, "New directions in cryptography", *IEEE Trans. on Inform. Theory*, vol. IT-22, 644–654, 1976], hereinafter referred to as "Diffie-Hellman", most of the difficult exponentiations are executed using a constant exponent. The method of the following section (an efficient method for a retrival from a $\wp$field exponentiation), reduces computation time for those computations where a constant exponent is used. When this method is used, steps b) in the described exponentiation process (all $\wp(B \cdot H)N$ multiplications) are deleted, and the final value of B, after the q'th iteration of the exponentiation is multiplied in the Montgomery $\wp$field by a precalculated constant T.

To those involved in the implementation, it is obvious that for full RSA signatures, with this circuitry, using the Chinese Remainder Theorem [described in the aforementioned article by Knuth], it is possible to make a further more than 70% reduction of the computation time.

An efficient method for a retrival from a $\wp$field exponentiation

The square and multiply protocol of the previous section can be improved, and it is possible to reduce the number of $\wp$field multiplications during the iterative sequence by introducing a new precalculated constant, T, which is a function of the modulus, N, and the exponent, E.

$T = (2^n)^\Sigma$ mod $N = (I^{-1})^\Sigma$ mod $N$.

where $\Sigma = 2^{q-1} + E$ mod $2^{q-1}$ and q is the number of relevant bits in E (disregard any leading zeros).

The modular exponentiation can now be calculated with the sequence:

| Initially: | B = A |
| --- | --- |
| | FOR j = 2 TO q |
| | $B \yen \wp(B \cdot B)N$ |
| | IF E(j) = 1 THEN |
| | $B \yen \wp(B \cdot A)N$ |
| | END FOR |
| | $B \yen \wp(B \cdot T)N$ |

Assume again, that on each transition from one step to the next, N is subtracted from B, whenever B is larger than or equal to N.

Note again that every multiplication in the $\wp$field is equivalent to a modular multiplication of the same factors by I, e.g., $\wp(X \cdot Y) = X \cdot Y \cdot I$ mod N.

EXAMPLE 3

This example demonstrates the use of T in the calculation of $A^E$ mod N and makes T's definition obvious.

Assume n=4 and E=5=$0101_2$ q (after discarding E's leading zero) is 3, therefore:

E(1)=1; E(2)=0; and E(3)=1, and T is precalculated:

T=$(2^n)^\Sigma$ mod N=$(I^{-1})^\Sigma$ mod N.

$\Sigma = 2^{q-1} + E \bmod 2^{q-1} = 2^{3-1} + 5 \bmod 2^{3-1} = 4+1 = 5$ and therefore:

T=14 mod N.

as is seen when

Initially:
B = A
j = 2, E(2) = 0
$B \equiv \wp(B \cdot B)N \equiv A^2 \cdot I \bmod N$
j = 3, E(3) = 1
$B \equiv \wp(B \cdot B)N \equiv B^2 \equiv A^4 \cdot I^2 \cdot I \bmod N$
$B \equiv \wp(B \cdot B)N \equiv A^4 \cdot I^3 \cdot A \cdot I \bmod N$
and finally:
$B \yen \wp(B \cdot T)N \equiv A^5 \cdot I^4 \cdot I^{-5} \cdot I \bmod N \equiv A^5 \bmod N$ The introduction of the parameter T can be avoided if the following steps are followed in order to calculate $A^E$:
Assuming that we have precalculated the Montgomery constant, H, and that our device can both square and multiply in the P field, we wish to calculate:

C=$A^E$ mod N.

Let E(j) denote the j bit in the binary representation of the exponent E, starting with the MS bit whose index is 1 and concluding with the LS bit whose index is q, we can exponentiate as follows for odd exponents:

A* $\yen \wp(A \cdot H)N$
B = A*
FOR j = 2 TO q−1
  $B \yen \wp(B \cdot B)N$
  IF E(j) = 1 THEN
    $B \yen \wp(B \cdot A^*)N$
ENDFOR
$B \yen \wp(B \cdot A)N$
C = B In the transition from each step to the next, N is subtracted from B whenever B is larger than or equal to N.
After the last iteration, the value B is ¥ to $A^E$ mod N, and C is the final value. For even exponents, the last step could be:

$B \yen \wp(B \cdot 1)N$ instead of $B \yen \wp(B \cdot A)N$

To clarify, we shall use the following example:

E=1011→E(1)=1; E(2)=0; E(3)=1; E(4)=1;

To find $A^{1011}$ mod N; q = 4
A* = $\wp(A \cdot H)N = AI^{-2} I = AI^{-1}$ mod N
B = A*
for j = 2 to q
$B = \wp(B \cdot B)N$ which produces: $A^2(I^{-1})^2 \cdot I = A^2 \cdot I^{-1}$
E(2) = 0;   $B = A^2 \cdot I^{-1}$
j = 3   $B = \wp(B \cdot B)N = A^2(I^{-1})^2 \cdot I = A^4 \cdot I^{-1}$ -continued E(3) = 1   $B = \wp(B \cdot A^*)N = (A^4 \cdot I^{-1})(AI^{-1}) \cdot I = A^5 \cdot I^{-1}$
j = 4      $B = \wp(B \cdot B)N = A^{10} \cdot I^{-2} \cdot I = A^{10} \cdot I^{-1}$ As E(4) was odd, the last multiplication will be by A, to remove the parasitic $I^{-1}$ $B = \wp(B \cdot A) = A^{10} \cdot I^{-1} \cdot A \cdot I = A^{11}$

C=B

Calculating the H parameter

The H parameter is a constant that is vital for computations in the Montgomery field. Using certain protocols, H will be a constant that might be precalculated on a larger computer; or in other cases it might be a useful constant which will be a first stage parameter used in calculating a more useful constant. See the previous section.

In regular communications it might be assumed that H will be precalculated, however, for several protocols, e.g., authenticating a signature in a random communication in RSA, it might be necessary to calculate H with this device, e.g., the Smart Card.

The H parameter is defined as:

H=$2^{2n}$ mod N.

This means that H is the remainder of a normal division operation wherein a string with an MS bit of one followed by 2n LS zeros (a 2n+1 bit long operand) is divided by the modular base N.

Binary division by the divisor, N, of a dividend consisting of a "1" and a string of zeros, is tantamount to sequentially trial-subtracting N, i.e. subtracting N from the residual trial-dividend when the most significant n+1 bits are larger than N. (Follow the example.)

Although the dividend is 2n+1 bits long, it will be obvious that the residual trial-dividend which is affected by a subtraction, is never more than n+1 bits long, and the LS digits are zeros.

For example:
Find H when N=$11_{10}$=$1011_2$, (therefore the bit length of N is 4, i.e., n=4)

Dividing, as we would manually perform long division base 2:

|       | 1 0111 |                              |
|-------|--------|------------------------------|
| 1011  | 1 0000 0000 |                         |
|       | 1011   | SUCCESSFUL SUBTRACT         |
|       | 0101 0 | ← result of the 1st round   |
|       | 101 1  | NO SUBTRACT                 |
|       | 101 00 | ← result of the 2nd round   |
|       | 10 11  | SUCCESSFUL SUBTRACT         |
|       | 10 010 | ← result of the 3rd round   |
|       | 1 011  | SUCCESSFUL SUBTRACT         |
|       | 0 1110 | ← result of the 4th round   |
|       | 0111   | SUCCESSFUL SUBTRACT         |

RESULT 5'TH (n + 1) round ← 0011 = H (3 base 10 = the remainder)

where we have verified that H=$3_{10}$.

There are n+1 trial subtractions in an H division process. Note also that the trial-dividend is also n+1 bits long. This sequence of subtractions will be followed in hardware in the description to follow.

SUMMARY OF THE INVENTION

A concurrent process and a unique hardware architecture have been provided, to perform modular exponentiation without division with the same number of operations as would be performed with a classic multiplication/division device, wherein a classic device would perform both a multiplication and a division on each operation. Division is usually a non-deterministic process, and considered more difficult and time consuming than multiplication.

The advantages realized in this invention result from a synchronized sequence of serial processes, which are merged to simultaneously (in parallel) achieve three multiplication operations on n bit operands, using two simple k bit serial/parallel multipliers in (n+2k) effective clock cycles.

By properly synchronizing and on the fly detecting and preloading operands, the machine operates in a deterministic fashion, wherein all multiplications and exponentiations are executed in a predetermined number of clock cycles. Conditional branches are replaced with local detection and compensation devices, thereby providing a basis for the simple type control mechanism, which, when refined, can consist of a series of self-exciting cascaded counters.

The machine has particularly lean demands on volatile memory, as operands are loaded into and stored in the machine for the total length of the operation; however, the machine exploits the CPU onto which it is appended, to execute simple loads and unloads, and sequencing of commands to the machine, whilst the machine performs its large number calculations. The exponentiation processing time is virnally independent of the CPU which controls it. In practice, no architecturial changes are necessary when appending the machine to any CPU. The hardware device is self-contained, and can be appended to any CPU bus.

When using these and previously patented and public domain process controlling protocols; the means for accelerating the modular multiplication and exponentiation process is provided, with means for precalculating the necessary constants.

The design of the preferred embodiments of the invention described herein was compacted and devised for the specific purpose of providing a modular mathematical operator for public key cryptographic applications on portable Smart Cards (identical in shape and size to the popular magnetic stripe credit and bank cards). These cards are to be used in a new generation of public key cryptographic devices for controlling access to computers, databases, and critical installations; to regulate and secure data flow in commercial, military and domestic transactions; to decrypt scrambled pay television programs, etc.

It should be appreciated that the device may also be incorporated in computer and fax terminals, door locks, vending machines, etc.

The hardware described carries out modular multiplication and exponentiation by applying the $\wp$ operator in a new and original proceeding. Further, the squaring can be carried out in the same method, by applying it to a multiplicand and a multiplier that are equal. Modular exponentiation involves a succession of modular multiplications and squarings, and therefore is carried out by a method which comprises the repeated, suitably combined and oriented application of the aforesaid multiplication squaring and exponentiation methods. However, a novel and improved way of carrying out modular exponentiation will be further specified herein.

The method for carrying out modular multiplication, wherein the multiplicand, A, the multiplier, B, and the modulus, N, comprise m characters of k bits each, the multiplicand and the multiplier not being greater than the modulus, comprises the steps of:

1—precalculating a parameter H and at least the least significant character $J_0$ of another parameter J, as hereinafter defined, and loading $J_0$ into a k bit register;

2—loading the multiplier B and the modulus N into respective registers of n bit length, wherein $n = m \cdot k$;

3—setting an n-bit long register S to zero; and

4—carrying out an i-iteration m times, wherein i is from zero to m−1, each ith iteration comprising the following operations:

a) transferring the ith character $A_{i-1}$ of the multiplicand A from $A_i$ register means to storing means chosen from among register and latch means;

b) generating the value $X = S(i-1) + A_{i-1} \cdot B$, wherein $S(i-1)$ is the "updated" value of S, as hereinafter defined, by:

I cycle right shifting of the B register into multiplying means,

II serially multiplying B by $A_{i-1}$,

III cycle right shifting of the modulus register N,

IV determining the "updated" value of $S(i-1)$ as the value stored in the S register after the (i−1)th iteration, if the same is not greater than N, or if it is greater than N, by serially subtracting N from it and assuming the resulting value as the "updated" value of $S(i-1)$; and V cycle right shifting of the register S and serially adding the value of the multiplication $A_{i-1} \cdot B$ bit by bit to the "updated" value of S;

c) multiplying the LS character of X, $X_0$ by $J_0$ and entering the value $X_0 \cdot J_0 \bmod 2^k$ into register means as $Y_0$, while delaying N and X by k clock cycles;

d) calculating the value $Z = X + Y_0 \cdot N$ by:

I multiplying $Y_0$ by N by a delayed right shifting of the N register concurrent with the aforesaid right cycle shifting thereof, and II adding X to the value of $Y_0 \cdot N$;

e) ignoring the least significant character of Z and entering the remaining characters into the S register, whereby to enter $Z/2^k$, except for the last iteration;

f) comparing $Z/2^k$ to N bit by bit for the purpose of determining the updated value of S, S(i) in the manner hereinbefore defined;

g) wherein the ith character of the multiplicand $A_i$ is loaded into the A register means at any time during the aforesaid operations;

5) at the last (m th) iteration, ignoring the least significant character of $Z/2^k$ and entering the remaining characters into the B register, as the value of $C¥\wp(A \cdot B)N$;

6) repeating the steps 3) to 4), wherein C or C−N, if C is greater than N, is substituted for B and H is substituted for A, whereby to calculate $P = \wp(C \cdot H) \bmod N$; and 7) assuming the value of $\wp$ obtained from the last iteration as the result of the operation $A \cdot B \bmod N$.

Also described is a method for performing the modular exponentiation of $D = A^E \bmod N$ which comprises the following steps:

1) loading the modulus number into the aforesaid register N;

2) setting the aforesaid register S to zero;

3) loading the base A to be exponentiated into the aforesaid register B;

4) storing the exponent E in a computer register;

5) shifting said exponent E left;

6) ignoring all the zero bits thereof which precede the first 1 bit and ignoring the first 1 bit of said exponent E, and for all the following bits performing the operations 7 to 9:

7) for every one of said bits, regardless of its being 0 or 1, squaring the content of register B by the multiplication method hereinbefore set forth, wherein the successive characters of the base are loaded into register $A_i$ from register B;

8) if and only if the current bit of the exponent E is 1, multiplying, after performing operation 7), the content of register B by the base A; and 9) after each Montgomery square or Montgomery multiply operation to perform a Montgomery C·H multiplication $\wp(C·H)N$, and 10) after performing steps 6–9 for all bits of E, storing the result of the last operation as $D¥A^E$ mod N in register B.

Furthers described is a method for performing modular exponentiation of $D=A^E$ mod N which comprises the steps of:

1) loading the modulus number into the aforesaid register N;

2) setting the aforesaid register S to zero;

3) loading the base A to be exponentiated into the aforesaid register B;

4) storing the exponent E in a computer register, and a precalculated parameter T in the CPU memory;

5) shifting said exponent E left;

6) ignoring all the zero bits thereof which precede the first 1 bit and ignoring the first 1 bit of said exponent E, and for all the following bits performing the operations 7 to 8:

7) for every one of said bits, regardless of its being 0 or 1, carrying out operations 4 and 5 of the multiplication method hereinbefore set forth, wherein both the multiplicand and the multiplier are the base A, and wherein the successive characters of the base are loaded into register $A_i$ from register B;

8) if and only if the current bit of the exponent E is 1, carrying out, after performing operation 7), operations 4 and 5 of the multiplication method hereinbefore set forth, wherein the multiplicand is the content of register B and the multiplier is the base A; and 9) after performing steps 7 and 8 for all bits of E, performing an additional Montgomery multiplication of register B by the parameter T $\wp(B·T)N$), and then storing the result of the last operation as $D¥A^E$ mod N in register B.

Parameter T is defined as $T=(2n)^S$ mod N, wherein $S=2^{q-1}+E$ mod $2^{q-1}$, as explained in detail in the parent application.

This invention provides an even more improved method for performing modular exponentiation of $D=A^E$ mod N, which comprises the steps of:

1) storing the exponent E in a computer register.

2) loading the modulus number into the aforesaid register N;

3) setting the aforesaid register S to zero;

4) performing a multiplication operation, of $A^*=\wp(A·H)N$ while A is the operand to be exponentiated, and H is a precalculated parameter as defined before.

5) loading A* into the base register B.

6) performing a squaring operation of the contents of register B.

7) shifting said exponent E left;

8) ignoring all the zero bits thereof which precede the first 1 bit and ignoring the first 1 bit of said exponent E, and for all the following bits performing the operations 9 to 10:

9) for every one of said E bits, regardless of its being 0 or 1, carrying out operations 4 and 5 of the squaring method hereinbefore set forth, wherein both the multiplicand and the multiplier originate from the B register, and wherein the successive characters of the Montgomery multiplier are loaded into register $A_i$ from register B;

10) if and only if the current bit of the exponent E is 1, carrying out, after performing operation 9, operations 4 and 5 of the multiplication method hereinbefore set forth, wherein the multiplicand is the content of register B and the multiplier is the base A*; and 11) after performing steps 8–10 for all bits of E, performing an additional Montgomery multiplication of register B by the original base A and then storing the result of the last operation as $D¥A^E$ mod N in register B if the exponent is odd; if the exponent were even, perform an additional Montgomery multiplication of D times 1: $B¥_\wp(D·1)¥D·I$.

It is seen that the exponentiation method of this invention eliminates the need for the computation of the parameter T, hereinbefore mentioned.

It has further been found, and this is another object of the present invention, that the machine described (in a 512 bit register size form) permits obtaining the result of the conventional multiplication of two n/2 bit numbers (actually any two operands which when multiplied will not cause a result longer than n bits, i.e. an overflow) without using the additional hardware or the cumbersome operations that would be required to obtain it according to the prior art. This is achieved by carrying out modular multiplication of said numbers by the multiplication process, wherein the value of the modulus, N, is an n bit number consisting of all "1's" (ffffff .... fff), equating $J_0$ to 1, and loading the multiplicand in B and manipulating A as in said multiplication process.

The device for carrying out such multiplication in the normal field of numbers by the aforesaid method can be the same device which comprises control means including a CPU and a multiplication circuit which comprises:

an n bit shift register B for the multiplier;

an n bit shift register N for the modulus;

an n bit shift register for the value S as herein defined;

a k bit register $A_i$ for the multiplicand;

k bit register means for the values $J_0$ and $Y_0$ as herein defined;

multiplier means for multiplying the content of the B register by that of the $A_i$ register;

additional n-bit multiplier means; and adding, subtracting, multiplexing and delay means.

Preferably, all connections between the n bit registers and the remaining components are 1 bit serial connections.

More specifically the figures depict several layers of logical concepts necessary for understanding the device in its totality. In all cases, the clock signal motivates the circuit, and if there is a reset signal, its purpose is to initialize a circuit to a zero state.

DETAILED DESCRIPTION OF PREFERRED EMBODIMENTS

Figure 1:
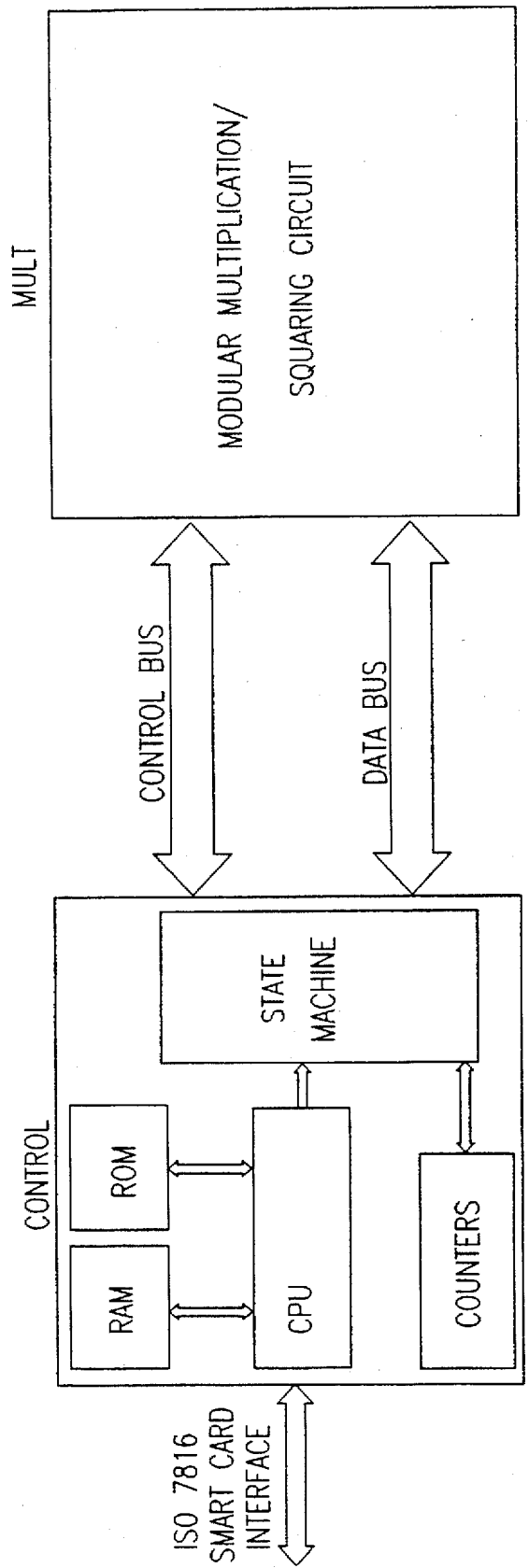
FIG. 1 is a block diagram of an apparatus according to an embodiment of the invention.

FIG. 1 is a block diagram of the monolithic circuit into which the invention is integrated. The MULT block contains the hardware device which is the basis for the invention; the State machine contains the controller which drives the MULT circuit; the ROM block contains all the non-volatile memory (ROM and EEPROM), wherein the program for controlling the Smart Card resides, the trusted third parry public keys, and the program for driving the MULT block and the State machine; the RAM block contains the volatile memory which stores temporary operands, such as messages to be exponentiated, public keys to be authenticated, data in transit to the MULT block, etc.; the CPU (central processing unit) can be virtually any popular microcontroller which has an 8 bit or wider internal bus.

Figure 2:
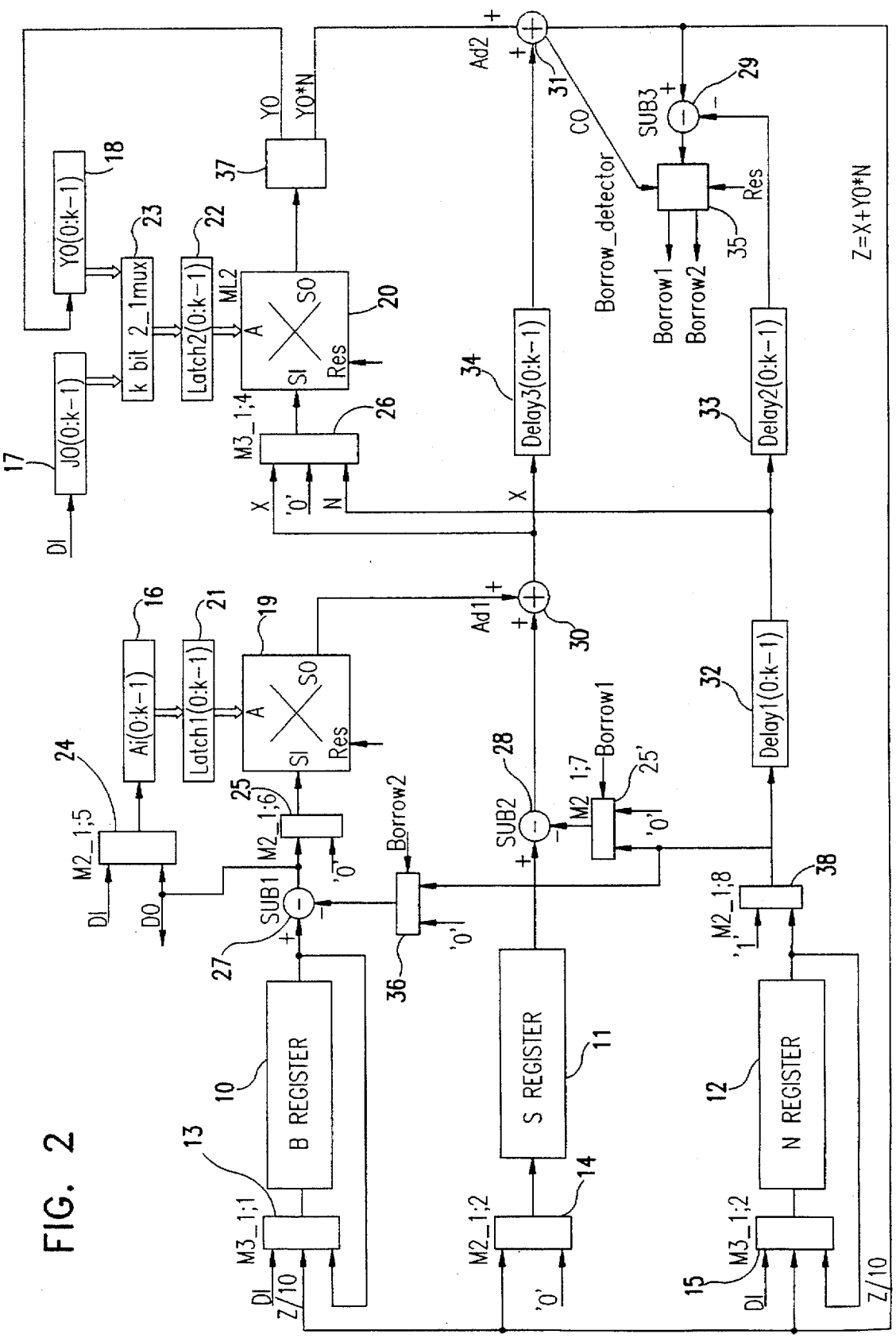
FIG. 2 is a block diagram of a modular multiplication circuit according to an embodiment of the invention.

FIG. 2 shows in block diagram form a modular multiplication circuit according to the invention, which can be used for carrying out modular squaring and modular exponentiation. Numerals 10, 11 and 12 indicate three registers that are n bit long n=k·m which constitute B, S and N registers respectively into which the multiplier value S and the modulus are loaded. The aforesaid registers are preferably divided into two n/2 registers, preferably including a k least significant bit subdivision for the N and B registers. Multiplexers 13, 14 and 15 respectively are placed before the said registers, and if they are subdivided into component parts, a multiplexer is placed before each subdivision. Also shown in a block diagram, these registers are intended to be serially loaded, but it would also be possible to load them in parallel. 16, 17 and 18 are three registers, each of which is k bits long, for receiving the values $A_i$, $J_0$, and $Y_0$ values respectively. Registers 16 and 17 are serial load-parallel output or serial and parallel load-parallel output shift registers. Register 18 is preferably a serial in parallel output shift register. The content of these registers is intended to be processed by multiplying means 19 and 20 through components 21 and 22, which are preferably k bit latches. If they are latches, they are loaded from registers 16, 17 and 18 through k bit buses. If they are registers, they can be serially loaded through 1 bit connections. Numerals 24, 25, 25', 26, 36, 37 and 38 also designate multiplexers. Multipliers 19 and 20 may be A serial, B parallel inputs, serial output multiplier means or any other serial/parallel inputs-serial outputs multiplying means. Multiplexer 38 can force the modulus N to be all "1"s for multiplying in the normal field of numbers.

Numerals 27, 28, 29, 30, and 31 designate 1 bit full/half adder/subtract means. 31 designates a full adder/subtract means. 32, 33 and 34 designate k bit k clock cycle delay means capable of delaying digital signals, which may be composed of analog or digital components, though digital components are preferred. 35 is a Borrow detector, which is a two bit latch/storage means. As is seen, the device according to the invention although it is intended to handle large numbers such as 512 bit numbers does not comprise buses, except optionally a few k bit buses, and this constitutes an important saving of hardware. When registers B, S and N comprise n/2 bit parts, the device of the invention can be used to carry out multiplication and exponentiation operations on 256 bit numbers, which is a substantial advantage as to the flexibility of the use of the device.

Figure 3:
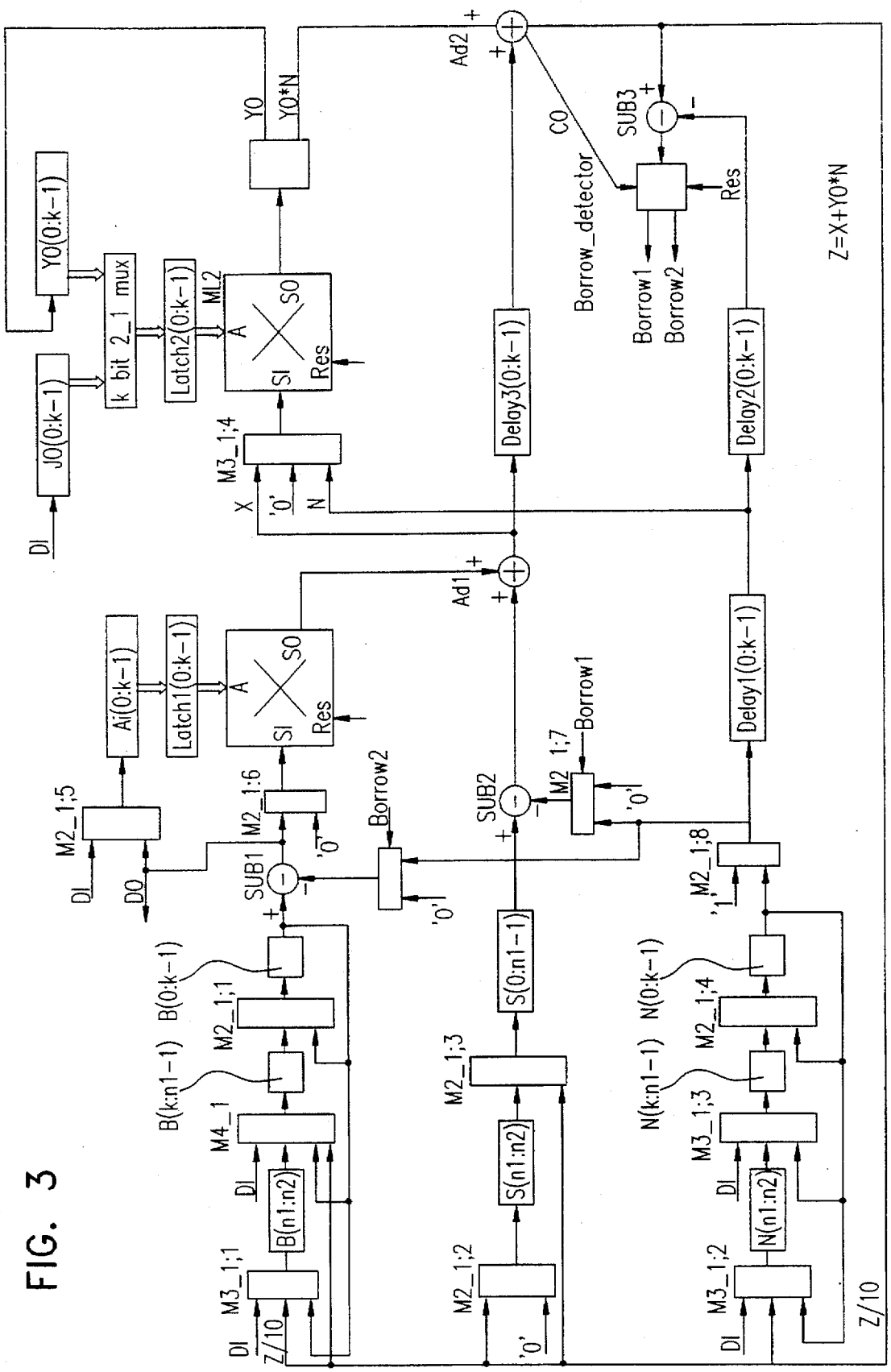
FIG. 3 shows the particular modular multiplication circuit according to an embodiment of the invention.

FIG. 3 shows the logic cells according to one preferred embodiment of the invention. Operands are fed into the $A_i$ latch, the $J_0$ register, the B register and the N register via serial connect DI, and results are unloaded via serial connect DO, from the B or S register.

Signal X is the bit stream summation of the product of B and $A_i$ and S. (Values after S and B have assumed values smaller than N.) Signal $Y_0$ is the k LS bit stream of the product of $J_0$ and X. Signal Z is the summation of X and the product of $Y_0$ and N. The k LS bits of Z, being all zeros are disregarded, and only the n MS bits are serially fed into S or B.

The Borrow_detector is a logic circuit which detects whether the value of $Z/2^k$ is, or is not larger than N.

The subtractors Sub1 and Sub2 subtract the bit stream N from the bit streams of B and S, whenever B or S is larger than N.

Ad1 and Ad2 summate bit streams to produce X and Z streams.

The Delay1 and Delay2 shift registers are necessary to provide storage for synchronizing the mathematical processes.

No clocking controls are included in the drawing. It is assumed that clocks are supplied by the state machine whenever data must either emanate from or be fed into any of the above mentioned serially loaded/unloaded logic circuits.

Other controls are also not specified, i.e., multiplexer addresses, latch transfer signals, etc., which should be obvious to those acquainted with the an from the explanatory material included in this specification.

It will be evident to skilled persons how the device of FIG. 2 or FIG. 3 carries out the operations which constitute the multiplication method according to the invention. The timing relationship of said operation is, however, further illustrated in FIG. 4. Said figure diagramatically illustrates all the various operations carried out in effective successive clock cycles in an embodiment of the invention, in which n=512, k=32 and m=16. This is a fairly common situation in the encryption art. When the invention is carried out according to the embodiment illustrated in FIG. 3, the same device can be used to operate with n=256, as well.

Figure 4:
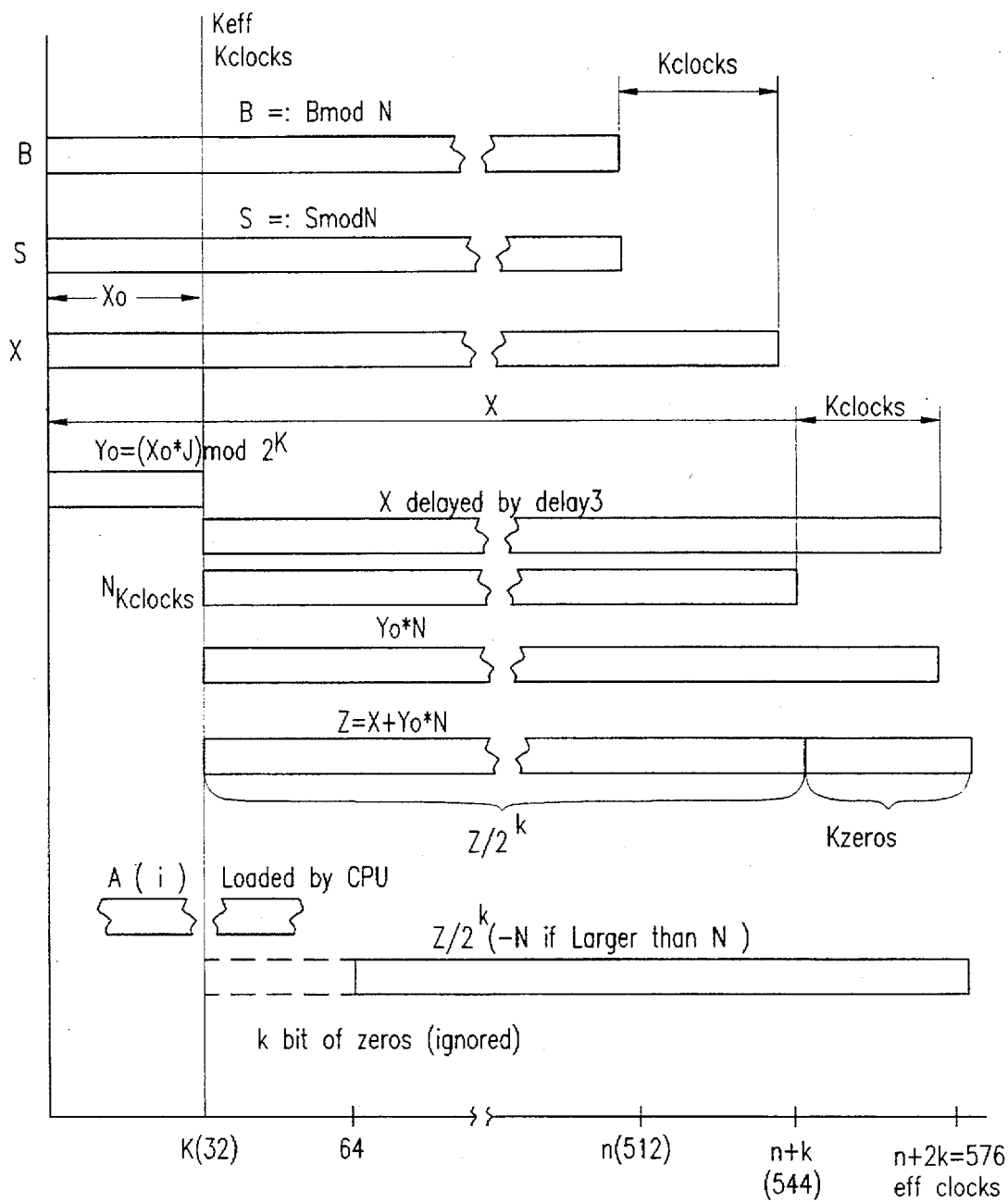
FIG. 4 is a schematic diagram illustrating the timing relationship between the various operation of an iteration of the multiplication operation according to an embodiment of the invention.

In FIG. 4 a succession of the various operations is illustrated as a function of the effective clock cycles, which are marked on the abscissa axis. At the beginning of the operation and before any of the iterations which form a part of the modular multiplication method according to the invention, the values of B, N and S are loaded in the respective registers. The first character of A is also loaded into the respective register. As soon as an iteration begins and during k clock cycles, the shifting of the content of the B and S registers is carried out. The generation of the X value takes place during n+k effective clock cycles, the first k clock cycles being occupied by entering the value of $X_0$. During the first effective k clock cycles the value of $Y_0$ has been entered. During the next effective n+k clock cycles, the value of X, which had been introduced into multiplier 20, is now shifted or introduced into adder 31 after having been delayed by delay 34. The value of N is used at three different time phases. First, to "update" S and B, second, delayed k effective clock cycles to multiply by $Y_0$, and then delayed a second k effective clock cycles to sense how the next value of S or B will be "updated". During the same n+k effective clock cycles, Z is calculated, as well as $Z/2^k$. The value of $A_i$ is loaded beginning with the first k effective clock cycles and continuing during the successive part of the iteration. The final value of $Z/2^k$ is entered into register S (or B) during n clock cycles after the first 2k effective clock cycles.

Figure 5:
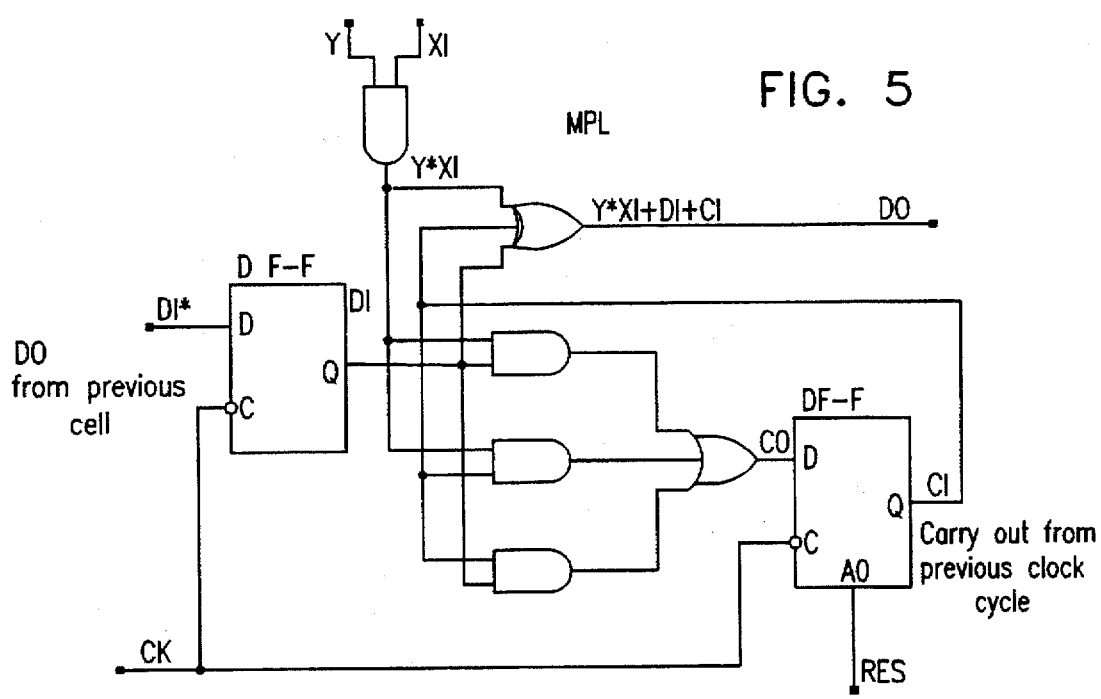
FIG. 5 illustrates a serial/parallel multiplier cell.

FIG. 5 shows an implementation of a serial/parallel multiplier cell (as an aid to those technical people who are familiar with the art, but who may not be aware of the workings of such a configuration). Each of these cells comprise an MPL block as shown in FIG. 6.

Figure 6:
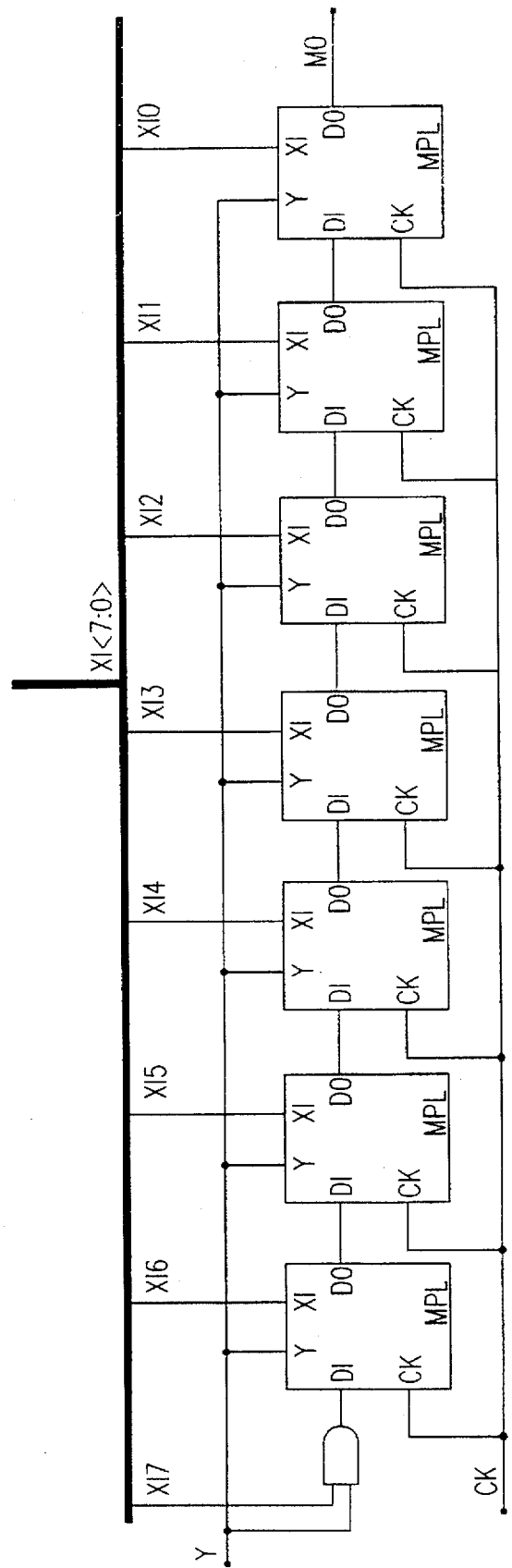
FIG. 6 illustrates an 8 bit serial/parallel multiplier.

FIG. 6 shows an implementation of an 8 bit serial/parallel multiplier. It implements Booth's multiplication algorithm for unsigned serial/parallel multiplication. In the ML1 and ML2 blocks of FIG. 3, the s/p multipliers are k bits long. Note that the MS cell is degenerate. The parallel 8 bit multiplicand is input on the XI connections and the n bit long serial multiplier is input on the Y connector (LS bit first, and a string of k zeros after the MS bit of the multiplier). The product is output on MO, LS bit first, MS bit last, wherein a full product is n+k bits long.

Figure 7:
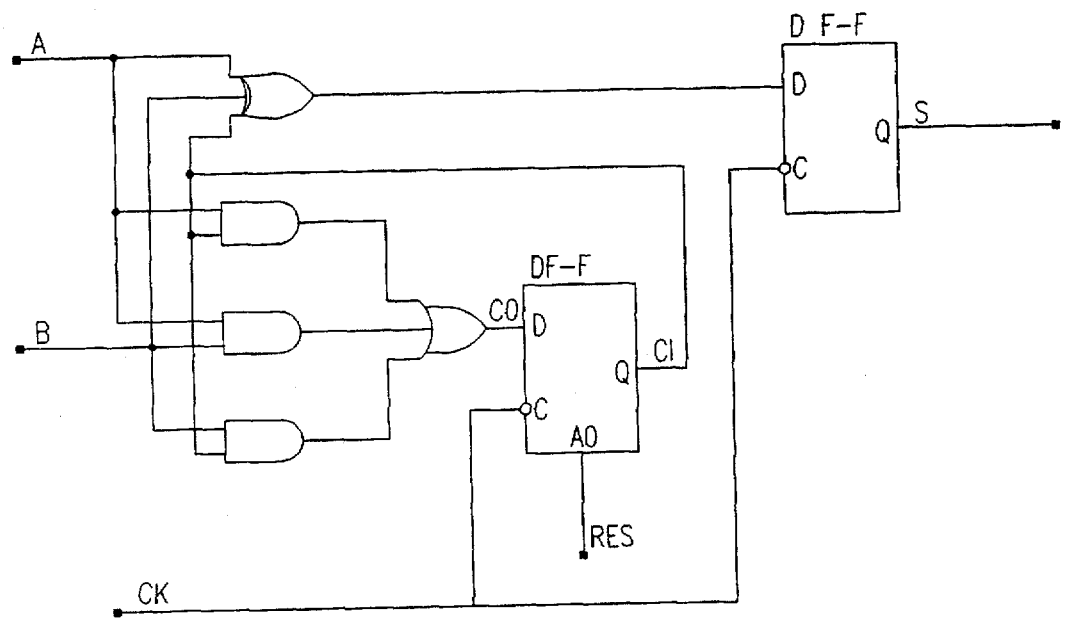
FIG. 7 illustrates a serial adder.

FIG. 7 shows the serial adders for summating two bit streams which appear on A and B input connections, and outputs the summate stream on connect S. The LS bits are first to be input, and the output stream, for operands of m bits long is m+l bits long. At the end of the m'th effective clock, the CI output is the (m+l)'th bit of the number string.

Figure 8:
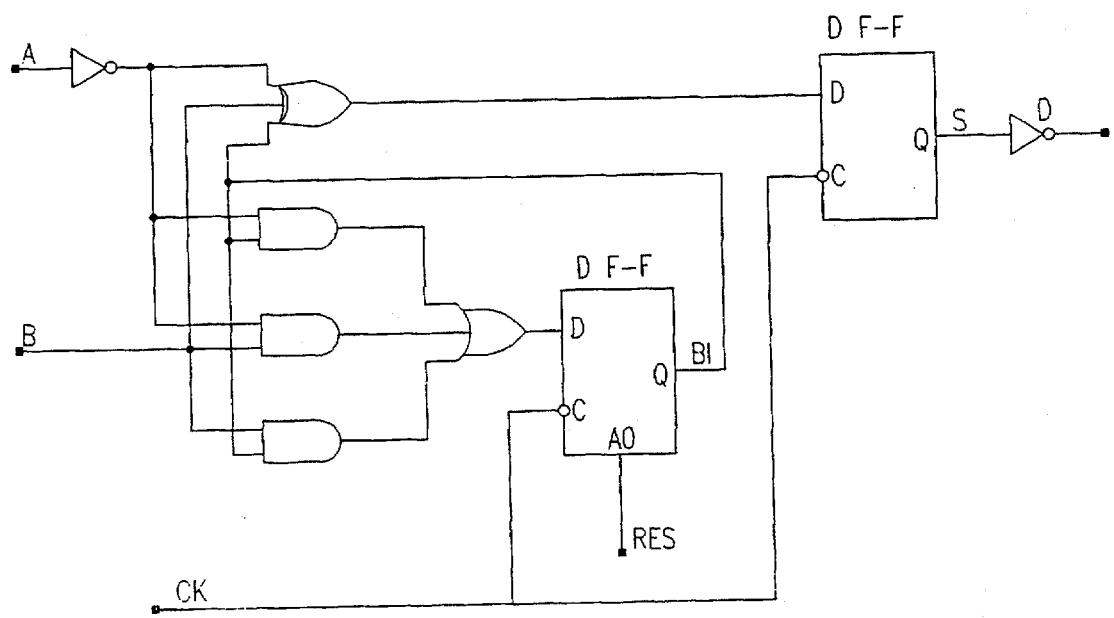
FIG. 8 illustrates a serial subtractor.

FIG. 8 shows the serial subtractors for emitting the difference between two bit streams which appear on the A and B input connections, and output the difference stream on the D connection. The LS bits are first to be input, and the output stream, for operands of m bits long is m bits long. At the end of the m'th bit, the BI output is the (m+1)'th bit of the number string and serves as a borrow out indication.

Figure 9:
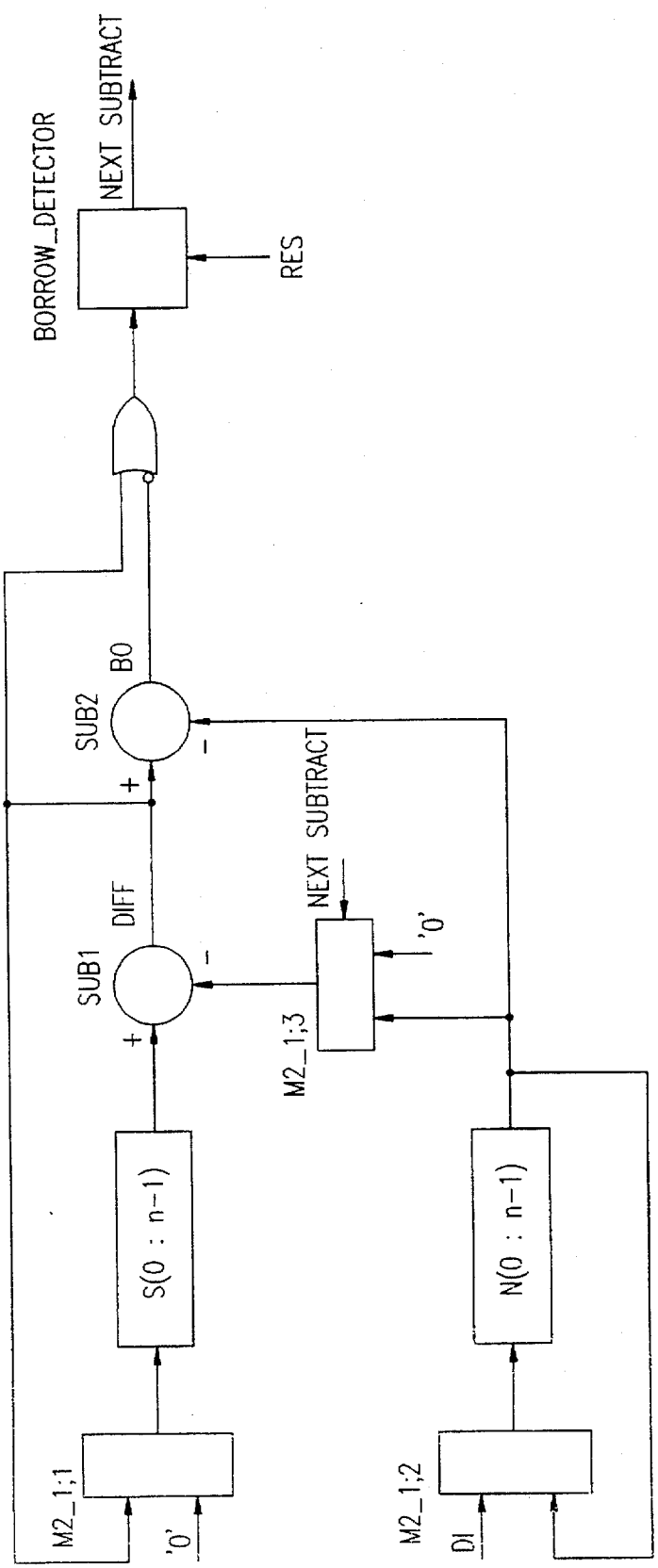
FIG. 9 illustrates an architecture for calculating the H parameter.

FIG. 9 shows the hardware layout for calculating the H parameter for a module N, which is n bits long. During this mode of operation, for an n bit long module, the N register is rotated n+1 times, synchronized to the rotate of the S register, which rotates through Sub1 with a delay of the LS bit (an LS zero is inserted at the first clock cycle in M2_1;1). The borrow detector "knows" at the end of the complete rotation whether or not N will be subtracted from the S stream on the next round, and switches the previous subtract multiplexer accordingly for the next round.

As stated above, FIG. 1 illustrates in block diagram form a device for carrying out the methods according to the invention. Block CONTROL of the device includes:

1) A complete Central Processing Unit (CPU)
2) Counters
3) A State Machine.

The CPU contains volatile and non-volatile memory some of which can be utilized by this multiplication process. The CPU controls the modular arithmetic block in the circuit.

The CPU:

1) Communicates with a host.
2) Loads and unloads data to and from the chip.
3) Commands the circuit to perform a sequence of mathematical operations.
4) Is responsible for other cryptographic and noncryptographic; and data processing operations.

The counters generate the address for the embodied State Machine.

The State Machine decodes the addresses and generates control signals to the MULT block. These control signals command the MULT block to perform the proper sequence of operations necessary to calculate the $\wp(A \cdot B)_N$ transformation (where A can be equal to B).

FIG. 3 is a hardware block diagram of the hardware device that embodies the physical aspects of the invention (MULT), and is intended to aid in focusing onto several of the architectural concepts to be protected by this patent. The block concurrently implements the sequence specified in equations (1) to (5), and also, without changing the synchronous clocking, the transformations of S and B from limited congruence to equality. In this section we assume that the constants (functions of N), $J_0$ and H have been precalculated.

The circuit performs $\wp(A \cdot B)_N$. Using this function the circuit can be utilized to calculate:

$$B \cdot A \bmod N \qquad \qquad 1)$$

and $$B^2 \bmod N, \qquad \qquad 2)$$

wherein B must always be smaller than N.

Implementing $C = B \cdot A \bmod N$ (A can be equal to B):

1) The processor preloads the operand, B, into the B register, and the operand, N, into the N register.

2) Each time as the circuit in MULT starts calculating the next value of S, the circuit signals (flags) the CPU to preload the next $A_i$. After the S(m)'th iteration, a number which has ¥ congruence to B resides in the B register.

3) Block MULT calculates $F = \wp(B \cdot H)_N$ where H is a precalculated constant, in a sequence identical to steps 1) and 2), except that the processor will now preload the sequence of $H_i$ characters (using the same sequence as used when it previously loaded the $A_i$ characters).

Implementing $C = B^2 \bmod N$:

1) Assuming that register B contains a value which is known to be ¥ congruent to B, and the register N contains the module N (as is generally the case when squaring); the MULT block can now proceed to squaring by first preloading the Ai register with $B_0$, the LS character of $B_0$.

2) The calculation $B = \wp(B \cdot B)_N$ proceeds like the second step in the multiplication operation, except that the subsequent loading of the $B_i$ characters is done serially "on the fly" from the B registers, as the B register rotates.

3) Calculating $\wp(B \cdot H)$, if necessary, is identical to the previous step 3.

As will be apparent to the skilled person, the inventors do not claim that the serial/parallel (s/p) multipliers or any of the conventional components used form a part of the invention per se. The following is included to clarify the use of standard logic cells in the public domain as several of them are not commonly used. The gate implementation shown here is for demonstration only. Skilled technicians optimize these logic cells.

The operands A, B and N are each n bit long, made of m groups of k bit long characters, therefore n=k·m. In a hardware implementation where k=32; m can be either 8 or 16 binary bits long.

ML1, ML2

These multipliers execute the Booth's algorithm for unsigned multiplication, wherein the parallel operand is k cells (bits) long and the serially loaded operand can be of any required length.

Each serial/parallel multiplier is made of k−1 MPL cells (FIG. 5). The most significant cell, its MS bit, consists of an AND gate, only.

Each MPL cell multiplies the serial input Y with its parallel XI input bits and summates this result with the serial output of the preceding MPL unit and its own previous cycle's carry out bit.

The MPL cell is a 2 bit multiplier adder. The block multiplies the input bit XI and the serial input bit Y and summates the result with DI, (Dam In) and the carry CI, (Carry In) from the previous cycle. The final result is DO, (Data Out) and a CO, (Carry Out) for the next cycle. This carry out is stored in a Data Flip-Flop (D F—F).

$$DO=(DI+CI+XI\cdot Y) \bmod 2,$$

and the saved carry CO will be the CI on the next cycle. This carry is the Boolean sum:

$$CO=CI\cdot XI\cdot Y+CI\cdot DI+DI\cdot Y\cdot XI.$$

Ad1, Ad2

This is a simple 1 bit full adder with a D F—F. for saving the carry to be carried in at the next clock cycle (FIG. 7).

The two inputs A and B are summated with the carry CI from the previous cycle to generate the modulo 2 sum, which is saved in the D F—F for the output signal, S. Upon reset the carry bit is set to "0".

Sub1, Sub2, Sub3

Each of the blocks, described in FIG. 8, is a full subtractor with a storage D F—F for the previous borrow. This block is similar to the Ad1 block with the exceptions that it serially subtracts the B stream from the A stream.

Delay1, Delay2, Delay3

These are k bit shift registers consisting of k 1 bit concatenated memory devices. They are used to synchronize the various operands in the mathematical sequence. This will become obvious as the circuit is explained.

Ai, $J_0$, $Y_0$

These blocks are k bit long serial-in/parallel-out shift registers. k input bits enter in serially. After k effective clock cycles, these k bits appear in parallel on the output.

In FIG. 2 the thin lines are serial one bit conductors, and the bold lines denote k bit parallel conductors.

M4_1;x, M3_1;x, M2_1;x

These are one bit output multiplexers—M4_1;x which outputs 1 of 4 inputs—M3_1;x, which outputs 1 of 3 inputs, and M2_1;x, which outputs 1 of 2 inputs. x denotes the explicit index of a specific component.

B(0:k−1), B(k:n1−1), B(n1:n2), S(0:n1−1), S(n1:n2), N(0:k−1), N(k:n1−1), N(n1:n2)

These are shift registers. The size and place in the sequence of a longer register is designated by the numbers in the brackets, e.g., X(s:t) is a t−s+1 bit long shift register, s is the index for the first bit of X(s:t), and t is the index of the last bit of the X(s:t) register. For example, B(0:511) is composed of the three shorter cascaded registers: B(0:31), B(32:255) and B(256:511).

n1 is generally equal to n/2, e.g., 256. n1 must be a multiple of k.

n2 is equal to n−1.

k is the length of the machine character; i.e. the size of the serial/parallel multipliers.

Therefore, in the first implementation the following values are anticipated: n1=256, n2=511, n=512 and k=32.

Latch1, Latch2

These two latches are k bit registers. They are used to lock the parallel data into the multiplier to enable single clock parallel transitions in the multiplication sequences.

MULT Block Operation—$\wp$, Field Multiplications and Exponentiations.

For ease of explanation we have chosen to designate only those clock cycles which actually move data in registers; we define these "moving" cycles as "effective clock cycles".

$\wp(A\cdot B)$N Multiplication

Stage 1: Initial loading

The following registers are loaded through DI.

1) $J_0$ into the $J_0$ register. (precalculated by the CPU)

2) B into the B register.

3) N into the N register.

4) The first character of A, $A_0$, into the $A_2$ register.

Simultaneous to step 2, register S is loaded with zeros.

After loading these five registers the two parallel serial unsigned multipliers ML1, ML2, the serial adders Ad1, and Ad2 and the serial subtractors Sub1, Sub2 and Sub3 are reset.

Stage 2: Executing the B·$A_0$ iteration.

The data, $A_0$, loaded into register Ai is transferred into Latch1. Register B is cyclicly shifted to the right. At the initiation of a process the Borrow2 control signal is "0", therefore, the content of B simply passes unchanged through the subtractor Sub1 and is multiplied by $A_0$ in ML1. Register B's output is fed back, unchanged, into the register's input.

The result of this multiplication is serially added in Ad1 to the content of register S which is all zeros on this first iteration. This operation generates X as earlier described herein.

While these processes are progressing, the CPU preloads the next character of A, $A_1$, into Latch1.

$J_0$ from the $J_0$ register is loaded into Latch2. X is serially input to ML2 to be multiplied by $J_0$. Thus after k effective clocks, the content of the register $Y_0$ is the k least significant bits of the product of $X_0\cdot J_0$.

Then, after these first k effective clocks, ML2 is reset; the serial input multiplexer M3_1;4 is switched from the X stream to the N stream; the data in register $Y_0$ is parallel-loaded into Latch2 in place of $J_0$; and the output is switched to the $Y_0\cdot N$ stream. For the next n+k effective clock cycles the serial output result of the ML2 multiplication will be $Y_0\cdot N$. X which was delayed by k effective clocks is now summated in Ad2 to the product stream of ML2; this generates Z=X+$Y_0\cdot N$; a number wherein the k least significant bits are zeros.

The first k bits from Ad2 being all zeros are disregarded and the next n bits are serially returned to the S register. This final quantity may be larger than or equal to N (in which case it must be reduced by N); i.e., S(1)¥S(1) mod N.

To detect if S≧N; N is serially subtracted from this n bit long (Z/$2^k$) stream in Sub3. However, only the n'th Borrow bit is stored in the borrow-save flip-flop.

If this Borrow bit is "0" or the final carry bit CO of adder Ad2 is "1" then the new value in S is larger than N.

At the end of this first iteration, there is a value in the S register which is the ¥ limited congruence of S(1) mod N; registers $J_0$, B, and N retain the original values with which they were loaded; and the preload register, Ai, contains $A_1$.

Stage 3: Subsequent B·$A_i$ iterations.

The next character of A, $A_1$ is transferred into Latch1, the parallel input of ML1.

During the next and subsequent B·$A_i$ iterations, at the end of each iteration, the content of S is ¥ to S(i) mod N. If S(i):N, then N is to be subtracted from S(i) in Sub2.

As each iteration commences, the next character of A, $A_i$, is loaded by the CPU into the preload register, Ai.

℘(B·B)N Squaring operations.

The first operation in a normal exponentiation is a squaring operation, performed like a normal multiplication with the multiplier A loaded into the B register, and the multiplicand loaded into the Ai register in k bit increments as described in the previous section. Subsequent squarings are performed on operands (multiplier and multiplicand) whose limited congruence resides in the B register.

During such ℘(B·B)N, squarings, from the outset the $J_0$, S, B, and N registers are already loaded from a previous multiplication or squaring, and remain unchanged; however, at each iteration the Ai register must be loaded with a new character, derived from a k bit character which resides in the B register.

For these subsequent squarings, the Ai register is preloaded from the B stream "on the fly". Once the CPU has given the command to square, it has no task to perform during the subsequent B·$B_i$ squaring operations. The $B_i$'s which are loaded, are segments of B which have flown through Sub1 ($B_i$ segments of B's which are already smaller than N).

Stage 1: B·$B_0$ iteration

Initially, the last ¥ of S from the previous calculation resides in the B register.

The k LS bits of registers B and N are cyclically shifted to the right, thus after k effective clocks, the B and N registers are restored to their original states. The value in the B register is either the proper B value or the B–N value to be used for the next ℘ multiplication. So, for the first round, the Ai register is to be preloaded with either $B_0$ which resides in the B register or the k LS bits of B–N.

The purpose of this first k bit rotate is to be able to stream through Sub1 the first k bits of preload for register Ai. Immediately after being serially loaded, Ai is unloaded into Latch1, and the Ai preload register is free to be loaded with $B_1$, the second character of B.

During this and subsequent operations, as the Borrow2 signal is set or reset, the output string from Sub1 is positive and always smaller than N.

Now as all values are loaded into the registers, this first multiplication proceeds similarly to the B·$A_0$ iteration, as described in the previous section, except that as B rotates, as will be explained, $B_1$ is loaded into the Ai register (remember that in a multiplication the CPU loads the Ai register.)

As the second k bit character, $B_1$, emanates from the B stream, during this first B·$B_0$ process, the $B_1$ segment is serially switched into the Ai preload register "on the fly" in preparation for the next squaring operation, i.e., the B·$B_1$ iteration.

Stage 2: B·$B_1$ iteration.

The value loaded into the Ai register, $B_1$, is transferred to its output Latch1. During the next n+2k (e.g., n+64) effective clock cycles, the multiplication process on B·$B_1$ is performed as described above.

As before, the signals Borrow1 and Borrow2 determine if N is to be subtracted from the streams emanating from the B and S registers. If the number in the S register is larger than or equal to N then Borrow1 is set and with subtractor Sub2, N is subtracted from S. N is subtracted from B, if necessary, for the duration of a complete m iteration multiplication loop. Such a condition would have been sensed with Borrow2 at the end of the previous multiplication or square.

The two flip-flops, Borrow1 and Borrow2 contain the final values of the conditioned Borrow Out from Sub3. Borrow1 is set or reset after each iteration of S. Borrow2 is set or reset after the last S(m) iteration, whence B is loaded with S(m). The conditioned Borrow Out is the signal which indicates whether an S(i) is larger than N.

During the B·$B_1$ sequence, the $B_2$ character is loaded "on the fly" into the Ai preload register as the $B_2$ character exits the Sub 1 subtractor.

Stage 3: Subsequent B·$B_i$ multiplication iterations

The remaining m-2 iterations are performed; during each one, the $A_i$ register is loaded with the value of $B_i$ character as it exits Sub1, in preparation for the next loop.

The final result, a limited congruence, resides in both the S and B registers. This data will be rectified at Sub1, if necessary, as it is serially outputted through DO.

Operation of MULT block—Calculating the H parameter

To calculate H, the machine is reconfigured to use registers S and N as in FIG. 9. We demonstrate the operation of the operator, using the numerical example already employed above. This configuration performs an H calculation in n+1 rounds. On each round both S and N are rotated, each rotation being n effective clocks. On each round N circulates and returns unchanged. At the end of the i'th round, S and the "Next subtract" signal contain the equivalent of a limited ¥ congruence of S(i).

The initial conditions—1st Round

At the outset of the first round the module N is loaded into the N register and the borrow detect flag is reset, signifying that the first trial subtraction will be successful; the output flip flop of Sub1 is reset to zero. For round 1 we know that the MS (n'th) bit of the trial dividend is one. This bit is stored by inference in the "Next subtract" flip flop (no space in S). The "Next subtract" commands the S–N subtract in round 1. An example of the method shown and described herein for a 4 bit application is described in Appendix A.

2480/2561/2815/H/9

Appendix A:

We demonstrate, using the n=4 bit numerical example described above.

H Calculating Mode - Initial Condition

Stored in the Borrow Detector's Next Subtract Flag
⇩

At the outset, we know that the dividend's MS bit is "1"

$N = 1011_2$, n=4.

See Figure 7.

Therefore, as we know that there could be no borrow- we reset the Next subtract flag to zero S(0) The contents of the S register.

⇩ ⇩
┌─(0) 0000 {0000}⇔ "Virtual Zeros"
⇩

Borrow Detect-Next Subtract signal is a zero - so on the first round M2_1;3 will feed N to Sub1- The Diff will be S-N with a leading zero, or to be exact, 2·(S-N).

{These "virtual" LS zeros are not affected by a trial-subtract. At each round there will be one less zero in the "virtual zero counter"}

On the first clock cycle, the zero from the reset Sub1 output flip flop is fed into S's MS cell S just as the LS bit from S is fed into Sub1.

(The LS bit of S is always a zero "drawn" from the "virtual" LS zero counter".)

During the first n-1 clock cycles the LS n-1 bits of Diff will feed into S.

N is rotated back into its MS bit cell.

-38-

2480/2561/2815/H/5.

The BO (Borrow out) serial stream
is equal to the series of borrows
that result from the
    -Diff mod $2^n$- N    stream,
however, only the last borrow is
sampled and may be relevant.

On the n'th effective clock cycle,
"Next subtract" will raise a flag
for a subtract for the next round
<u>if</u> the MS bit of Diff is "1",
<u>OR</u> if BO = "0"

On the first round N is subtracted from $2^n$, and n bits of the result multiplied by 2 (an LS zero insertion) is returned to the S register, EXCEPT for the MS bit which is stored "by inference" in the Borrow Detect_Next Subtract register.

At the end of the first round rotate:

S(1)=1010, Next subtract =1 (BO=1), and we know that on the next round there will be no subtract of S-N in Sub1.

2480/2561/2815/H/.

H Parameter Calculation - 2nd Round

Stored in the Borrow Detector's Next Subtract Flag

⇩

At the outset, we know
that the second round
subtraction would not be
successful as BO = "1"
"detected" at Sub2.

$N = 1011_2$, $n=4$.

S(1) The contents of the S register after the first round =

⇩ ⇩
(1) 1010 {000} ⇐ "3 Virtual Zeros" Left

⇩

Borrow Detect-Next Subtract
signal is a one - so on this
round M2_1;3 will feed zeros
to Sub1- Diff = 2·S
THERE WAS NO SUBTRACT

(The LS bit of S is again a zero
"drawn" from the "virtual" LS zero
counter".)

For the subsequent n-1 clock cycles
the LS n-1 bits of Diff = 2·S will be
fed into the S register.

N is rotated back into its MS bit cell.

As the MS bit of Diff is a "1", we
know that on the next round we must
subtract S-N.

The sampled BO is irrelevant.

Diff=1 0100 and S(2)=0100, Next subtract =0, and we know that on the next
round there will be a subtract of S-N in Sub1.

- 40 -

2480/2561/2815/H/5

H Parameter Calculation - 3rd Round

Stored in the Borrow Detector's Next Subtract Flag
⇩

At the outset, we know
that the third round
subtraction will be
successful as the MS bit
of Diff was "1"

$N = 1011_2$, n=4.

S(2) The contents of the S register after the second round
⇩  ⇩
(0) 0100 {00} ⇔ "2 Virtual Zeros" Left
⇩

Borrow Detect-Next Subtract
signal is a zero  N will be
subtracted from Diff.

For the subsequent n-1 clock cycles
the LS n-1 bits of Diff = 2(S-N) will
be fed back into the S register.

As the MS bit of Diff is "1" in Sub1
in the next round we must subtract S-N.

Diff=1 0010 and S(3)=0010, Next subtract =0, and we know that on the next round there will be a subtract of S-N in Sub1.

H Parameter Calculation - 4th Round

Stored in the Borrow Detector's Next Subtract Flag
⇩

At the outset, we know
that the fourth round
subtraction will be
successful as the MS bit
of Diff was "1"

$N = 1011_2$, n=4.

S(3) The contents of the S register

- 41 -

2480/2561/2815/H.

```
                          |   after the third round
                          ⇩    ⇩
                  ┌──(0) 0010 (0) ⇦ "1 Virtual Zeros" Left
                  ⇩
```

Borrow Detect-Next Subtract signal is a zero  N will be
subtracted from Diff.

As their was no borrow BO="0" in
the next round we subtract S-N.

Diff=0 1110 and S(4)=1110, Next subtract =0, and we know that on the next round there will be a subtract of S-N in Sub1.

H Parameter Calculation - n+1'th (5th) Round

Stored in the Borrow Detector's Next Subtract Flag

```
                              ⇩
At the outset, we know        |          N = 1011₂, n=4.
that the fourth round         |
subtraction will be           |
successful as the MS bit      |
of Diff was "1"               |
                              |   S(4) The contents of the S register
                              |   after the fourth round
                          ⇩    ⇩
                  ┌──(0) 1110 () ⇦ "No Virtual Zeros" Left
                  ⇩                  Last Round
```

Borrow Detect-Next Subtract signal is a zero  N will be
subtracted from Diff.

Diff=0 0011 and S(5)=0011₂ is the remainder - which is the value of H.

- 42 -

The invention claimed is:

1. Microelectronic exponentiation apparatus for performing modular squaring and modular multiplication of a multiplier by a multiplicand, the apparatus comprising:

only three main switched and clocked serial-in serial-out registers including first (B), second (S) and third (N) switched and clocked serial-in serial-out registers each of whose bit length is at least equal to a bit length of the modulus, and which are respectively operative to store the multiplier, a partial result and a modulus; and a modular squaring and modular multiplication device operative to receive the multiplicand and to employ said only three main switched and clocked serial-in serial-out registers to perform modular squaring and modular multiplication, in the course of which at least one partial result is generated, including a subtraction device operative to compare at least one partial result to the modulus and, if the partial result is no less than the modulus, to subtract the modulus from the partial result using no more than three registers to store the multiplier the partial result and the modulus.

2. Apparatus according to claim 1 wherein said main switched and clocked registers are subdivided.

3. Apparatus according to claim 1 wherein each said hardware multiplying unit comprises a SIPO (serial in parallel out) multiplying unit.

4. Apparatus according to claim 1 wherein said multiplication device comprises a serial modular squaring and modular multiplication device operative to serially employ said registers to perform modular squaring and modular multiplication.

5. Apparatus according to claim 1 wherein the multiplication device comprises only two hardware multiplying units, wherein each hardware multiplying unit receives input from only two input channels including first and second input channels and performs at least one multiplication operations in each of which a quantity arriving through the first input channel is multiplied by a quantity arriving through the second input channel.

6. Apparatus according to claim 5 wherein each of said two hardware multiplying units comprises at least one latch storing multi-bit data and a multiplier receiving said multi-bit data in parallel.

7. A method of using microelectronic exponentiation apparatus for performing modular squaring and modular multiplication of a multiplier by a multiplicand, the method comprising:

providing microelectronic exponentiation apparatus including first (B), second(S) and third(N) main switched and clocked serial-in serial-out registers respectively operative to store the multiplier, a partial result and a modulus, a first multiplying device in which the multiplicand resides and which is operative to receive the multiplier residing in the B register, to multiply the multiplier by the multiplicand, and to output a product of said multiplication, a serial adder operating on the output of the first multiplying device and a partial Montgomery result residing in the S register and operative to output a result, and a second multiplying device including a single hardware multiplying unit receiving, in a first phase, the output of the serial adder and a Montgomery constant and receiving, in a second phase, a serially fed modulus residing in the N register and operative, in the first phase, to compute a product of the Montgomery constant by a portion of the output of the serial adder and, in the second phase, to multiply the modulus by the product; and employing said apparatus to carry out at least one of a modular multiplication operation or a modular squaring operation, wherein the single hardware multiplying unit receives input from only two input channels including first and second input channels and performs at least one multiplication operations in each of which a quantity arriving through the first input channel is multiplied by a quantity arriving through the second input channel.

8. A method according to claim 7 also comprising encrypting a message data signal on the basis of a result of said at least one operation.

9. A method according to claim 7 also comprising decrypting a message data signal on the basis of a result of said at least one operation.

10. A method according to claim 7 also comprising generating a digital signature on the basis of a result of said at least one operation.

11. A method according to claim 7 also comprising verifying a digital signature on the basis of a result of said at least one operation.

12. A method for performing modular squaring and modular multiplication of a multiplier by a multiplicand, the method comprising:

providing only three main switched and clocked serial in serial out registers including first, second and third switched and clocked serial in serial out registers each of whose bit length is at least equal to the bit length of the modulus, and which are respectively operative to store the multiplier, a partial result and a modulus; and receiving the multiplicand and employing said only three main switched and clocked serial in serial out registers to perform at least one of a modular squaring operation or a modular one partial result is generated, including comparing at least one partial result to the modulus and, if the partial result is no less than the modulus, to subtract the modulus from the partial result using no more than three main registers to store the multiplier, the partial result and the modulus.

13. A method according to claim 12 also comprising encrypting a message data signal on the basis of a result of said at least one operation.

14. A method according to claim 12 also comprising decrypting a message data signal on the basis of a result of said at least one operation.

15. A method according to claim 12 also comprising generating a digital signature on the basis of a result of said at least one operation.

16. A method according to claim 12 also comprising verifying a digital signature on the basis of a result of said at least one operation.

* * * * *

UNITED STATES PATENT AND TRADEMARK OFFICE
CERTIFICATE OF CORRECTION

PATENT NO. : 5,742,530

DATED : APRIL 21, 1998

INVENTOR(S) : GRESSEL ET AL.

It is certified that error appears in the above-identified patent and that said Letters Patent is hereby corrected as shown below:

Title page, [63] Related U.S. Application Data: "1995" should read —1993—

Col. 1, line 7: "1995" should read —1993—

Col. 1, line 7: "5,513,132" should read —5,513,133—

Col. 4, line 1: "$p(P \cdot H)_N \equiv A \cdot \bmod N;$" should read —$p(P \cdot H)_N \equiv A \cdot B \bmod N;$—

Col. 4, line 20: "3) Z=X 30 Y·N" should read —3) Z=X+Y·N—

Col. 6, line 10: "$H \equiv 2^{.12}$" should read —$H \equiv 2^{2.12}$—

Col. 7, line 41, step 3: "= e6 d0" should read —= e6 d9—

Col. 8, line 16: "*Tram.*" should read —*Trans.*—

Col. 9, line 13: "$T=14 \bmod N.$" should read —$T=I^{-5} \bmod N.$—

Col. 9, line 23: "$B \equiv p(B \cdot B)_N \equiv A^4$" should read —$B \equiv p(B \cdot A)_N \equiv A^4$—

Col. 10, line 49: "1011  1  0000 0000" should read —1011 / 1  0000 0000—

UNITED STATES PATENT AND TRADEMARK OFFICE
CERTIFICATE OF CORRECTION

PATENT NO. : 5,742,530

DATED : APRIL 21, 1998

INVENTOR(S) : GRESSEL ET AL.

It is certified that error appears in the above-identified patent and that said Letters Patent is hereby corrected as shown below:

Col. 10, line 59: "0111" should read —1011—

Col. 11, line 31: "vimally" should read —virtually—

Col. 14, line 28: "$_p(D\cdot 1)$" should read —$p(D\cdot 1)$—

Col. 16, line 46: "an" should read —art—

Col. 19, line 56: "$M2\_1{:}x$" should read —$M2\_1{:}x$—

Col. 23, line 1: insert —Appendix A:— before paragraph which begins "We demonstrate..."

Signed and Sealed this

Eighteenth Day of January, 2000

Attest:

Q. TODD DICKINSON

*Attesting Officer*   *Commissioner of Patents and Trademarks*